United States Patent [19]

Matsuda et al.

[11] Patent Number: 4,860,214
[45] Date of Patent: Aug. 22, 1989

[54] INFERENCE SYSTEM

[75] Inventors: Toru Matsuda, Kawasaki; Takanori Yano, Tokyo; Toshiaki Okamoto, Yokohama; Akira Okamoto, Tokyo, all of Japan

[73] Assignee: Ricoh Company, Ltd., Japan

[21] Appl. No.: 145,237

[22] Filed: Jan. 19, 1988

[30] Foreign Application Priority Data

| Jan. 22, 1987 [JP] | Japan | 62-11283 |
| Apr. 7, 1987 [JP] | Japan | 62-83855 |
| Apr. 9, 1987 [JP] | Japan | 62-88606 |
| Apr. 9, 1987 [JP] | Japan | 62-88607 |
| May 19, 1987 [JP] | Japan | 62-120132 |
| Jun. 29, 1987 [JP] | Japan | 62-159646 |
| Nov. 30, 1987 [JP] | Japan | 62-299677 |

[51] Int. Cl.⁴ .......................................... G06F 15/00
[52] U.S. Cl. ...................................... 364/513; 364/300
[58] Field of Search ................ 364/200, 300, 513, 900

[56] References Cited

U.S. PATENT DOCUMENTS 4,591,983  5/1986  Bennett et al. .................... 364/513

OTHER PUBLICATIONS

An Extension of Dempster & Shafer's Theory to Fuzzy Set for Constructing Expert Systems; Ishizuka; Jul. 1982.

Another Extension of Dempster & Shafer's Theory To Fuzzy Set for Constructing Expert Systems; Ishizuka; Sep. 1983.

Henri Prade, A Computational Approach to Approximate and Plausible Reasoning With Applications to Expert Systems, May 1985, pp. 260–283.

Primary Examiner—Allen MacDonald
Attorney, Agent, or Firm—Mason, Fenwick & Lawrence

[57] ABSTRACT

An inference system comprises an input part for entering data to be used for making an inference, a data storage part for storing data showing a possibility of a conclusion depending on the data entered from the input part, an inference part for making an inference by eliminating a degree of fuzziness of the conclusion by use of the data entered from the input part and an output part for outputting the conclusion obtained from the inference part. The inference part converts the data obtained from the data storage part into Dempster-Shafer's basic probability assignment data in making the inference.

20 Claims, 20 Drawing Sheets

| QUESTION | ANSWER | COW | HORSE | DOG | CAT | HUMAN | PIG |
|---|---|---|---|---|---|---|---|
| IS THE ANIMAL BIG? | YES | 0.99 | 0.99 | 0.01 | 0 | 0.5 | 0.5 |
|  | NO | 0.2 | 0.2 | 0.99 | 1 | 0.9 | 0.9 |
|  | EITHER | 0.8 | 0.8 | 0.7 | 0.01 | 1 | 1 |
|  | UNKNOWN | 1.0 | 1.0 | 1.0 | 1.0 | 1.0 | 1.0 |
| DOES THE ANIMAL CLIMB A TREE? | YES | 0 | 0 | 0 | 0.99 | 0.99 | 0 |
|  | NO | 1 | 1 | 1 | 0.2 | 0.2 | 0 |
|  | EITHER | 0.01 | 0.01 | 0.01 | 0.8 | 0.8 | 0.01 |
|  | UNKNOWN | 1.0 | 1.0 | 1.0 | 1.0 | 1.0 | 1.0 |

FIG.3

|  | PLATYPUS | KOALA | KANGAROO | SLOTH | ANTEATER | ARMADILLO | MOLE | HEDGEHOG | TREE-SHREW |
|---|---|---|---|---|---|---|---|---|---|
| BIGGER THAN HUMAN | * | * | △ | * | △ | × | * | * | * |
| LIVE UNDERWATER | ○ | * | * | × | × | × | * | * | * |
| DISTINCTIVE MARK ON BODY | × | * | * | * | ○ | * | * | * | * |
| STRONGER THAN HUMAN | * | * | △ | * | * | * | * | * | * |
| PET OR LIVESTOCK | * | * | * | * | * | × | * | × | * |
| CARNIVORA | ◎ | * | * | * | ◎ | ○ | ◎ | △ | △ |
| HAS FANG | * | × | × | × | * | × | × | × | × |
| HAS HORN | * | * | * | * | * | * | * | * | * |
| PRECIOUS FUR OR SKIN | △ | ○ | △ | * | * | * | * | * | * |

FIG.8

|  | ◎ | ○ | △ | × | * |
|---|---|---|---|---|---|
| YES | 100 | 99 | 60 | 5 | 0 |
| NO | 0 | 20 | 90 | 100 | 100 |
| EITHER | 5 | 99 | 100 | 99 | 5 |
| UNKNOWN | 100 | 100 | 100 | 100 | 100 |

FIG. 9
| QUESTION & ANSWER / CANDIDATES | PLATYPUS | KOALA | KANGAROO |
|---|---|---|---|
| BIGGER THAN HUMAN        YES | 0 | 0 | 60 |
| BIGGER THAN HUMAN         NO | 100 | 100 | 90 |
| BIGGER THAN HUMAN     EITHER | 1 | 1 | 100 |
| BIGGER THAN HUMAN    UNKNOWN | 100 | 100 | 100 |
FIG. 10A
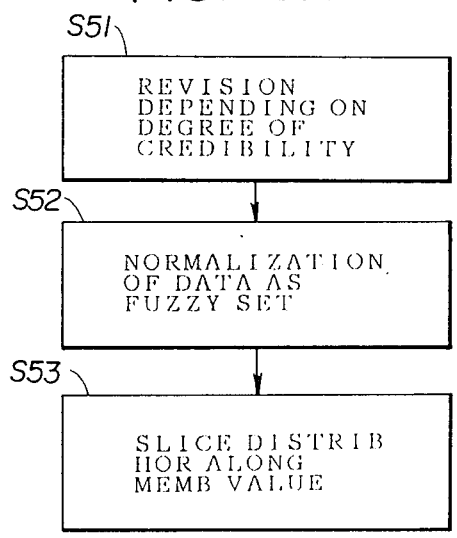
FIG. 10B
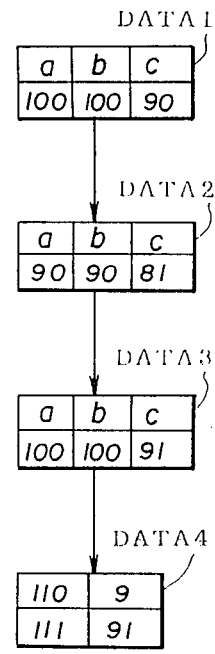

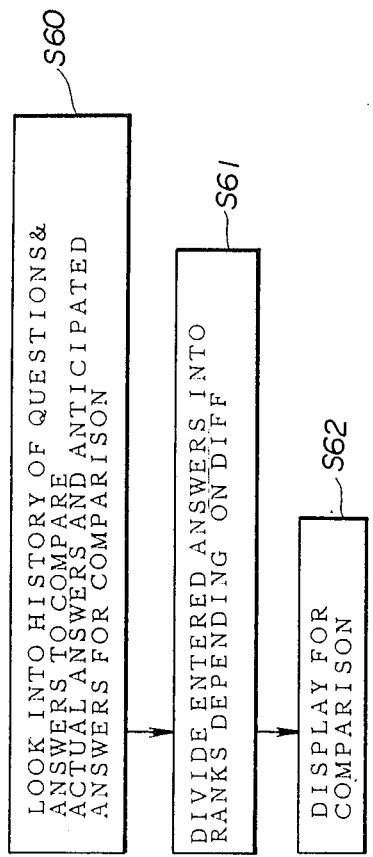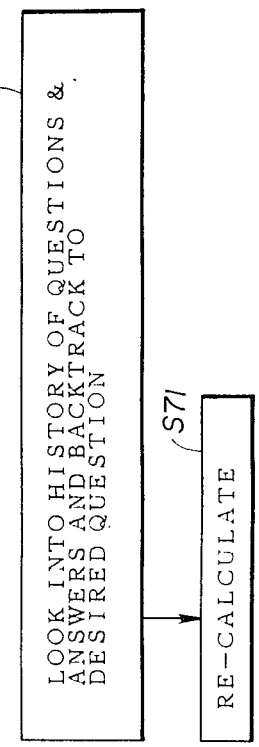

FIG. 17

| QUESTION | ANSWER | COW | HORSE | DOG | CAT | HUMAN | PIG |
|---|---|---|---|---|---|---|---|
| IS THE ANIMAL BIG? | YES | 0.99 | 0.99 | 0.01 | 0 | 0.5 | 0.5 |
| | NO | 0.2 | 0.2 | 0.99 | 1 | 0.9 | 0.9 |
| | EITHER | 0.8 | 0.8 | 0.7 | 0.01 | 1 | 1 |
| | UNKNOWN | 1.0 | 1.0 | 1.0 | 1.0 | 1.0 | 1.0 |
| DOES THE ANIMAL CLIMB A TREE? | YES | 0 | 0 | 0 | 0.99 | 0.99 | 0 |
| | NO | 1 | 1 | 1 | 0.2 | 0.2 | 0 |
| | EITHER | 0.01 | 0.01 | 0.01 | 0.8 | 0.8 | 0.01 |
| | UNKNOWN | 1.0 | 1.0 | 1.0 | 1.0 | 1.0 | 1.0 |

FIG.26A   FIG.26B   FIG.26C
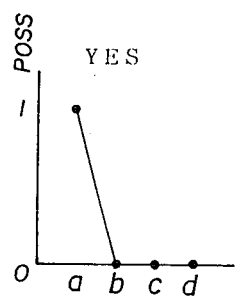 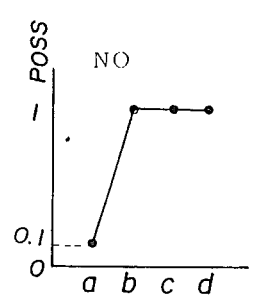 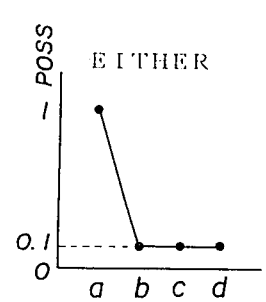
FIG.27A   FIG.27B   FIG.27C
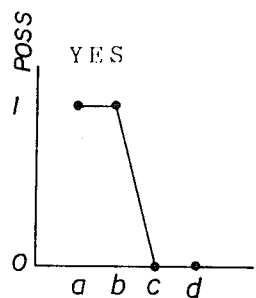 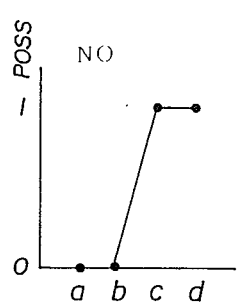 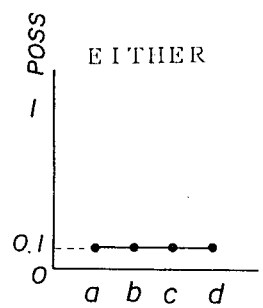

INFERENCE SYSTEM

BACKGROUND OF THE INVENTION

The present invention generally relates to inference systems, and more particularly to an inference system having an artificial intelligence for processing uncertain knowledge.

Not all human knowledge is certain, and for this reason, it is essential that uncertain knowledge can be processed in machines. Such machines must have a function of processing fuzzy or vague statements which are subjected to digitization or number coding.

An inference (or reasoning) system generally gives questions to a user and obtains an information from answers entered by the user. This information used to infer a result is restricted every time an answer is entered by the user in response to a question given by the inference system, because candidates for an inferred result (hereinafter referred to as a conclusion) of the inference can be limited as more information is obtained from the answers entered by the user. Accordingly, the inference system eliminates the degree of fuzziness by successively giving questions to the user.

Such an inference system is employed in the so-called expert system, and the expert system usually uses a certainty factor (CF) in accordance with the MYCIN system for describing a degree of belief with respect to a statement which may not necessarily be certain. However, the certainty factor (CF) simply does not take into account the total coordination, and for this reason, there is a problem in that the inference may lead to a strange conclusion such as "believing 100% that a value of a variable is equal to X while at the same time believing 100% that the value of this variable is equal to Y which is different from X" and "believing 100% that it is impossible that a value of a variable is not Z while at the same time believing only 60% that the value of this variable is Z".

The Bayes probability and the fuzzy theory are well known as digitization techniques for fuzzy statements. However, probability cannot describe ignorance. For example, when there is no knowledge on the authenticity of a certain statement S, it is irrational no matter what value is set for a probability P(S) that the statement S is true. In other words, when a negation of the statement S is denoted by $-S$, an equation $P(S)+P(-S)=1$ must stand as long as probability is used. Hence, $P(-S) > P(S)$ stands when it is assumed that $P(S) < \frac{1}{2}$, but one is ignorant on the authenticity of the statement S. Accordingly, one is also ignorant on the authenticity of the negation $-S$. But it is irrational that the probabilities $P(S)$ and $P(-S)$ differ even though one is ignorant on the authenticity of both the statement S and the negation $-S$.

On the other hand, in case the negation $-S$ is a disjoint sum of statements S' and S" and one is ignorant on the statements S' and S", an equation $P(S)+P(S')+P(S'')=1$ must stand when it is assumed that $P(S) > \frac{1}{3}$. Hence, $P(S) > \min\{P(S'), P(S'')\}$ stands, and the irrationality also exists. Therefore, the probability $P(S)$ must be $\frac{1}{2}$ or greater and at the same time be $\frac{1}{3}$ or less, and the irrationality exists no matter what value is set for the probability $P(S)$.

The degree of ignorance can be described by the fuzzy theory. However, the processing of the fuzzy statements after being subjected to the digitization is extremely complex. For this reason, the fuzzy theory is suited for application in a high-speed processing such as a real-time control in which a feedback is obtained within a short time, but the reliability of the conclusion becomes poor when the fuzzy theory is applied to a processing having no feedback.

The Dempster-Shafer theory includes both the probability method and the fuzzy theory. Although the Dempster-Shafer theory is known, it is difficult to understand its general idea thereby making it difficult to apply the Dempster-Shafer theory to a knowledge processing system. In other words, it is difficult to set appropriate values, and the Dempster-Shafer theory is hardly used for processing fuzzy statements in actual practice.

Generally, the inference system gives the questions prepared beforehand to the user comprehensively. Accordingly, unnecessary questions and invalid questions are given and puts unnecessary burden on the user who must read and answer all of these questions.

Even in the case where all of the prepared questions are given, the user need not answer all of the questions if the inference system can process the fuzzy statements. In this case, the conclusion is obtained based on the answers to the questions the user elected to answer. However, there is still a burden on the user in that the user must read all of the prepared questions regardless of whether or not he elects to answer each question.

In the inference system which processes the fuzzy statements, the inference is made by converting data describing the possibility of a conclusion which will be obtained according to an answer to a question into Dempster-Shafer's basic probability assignment data, for example. As the conclusion which is obtained by the inference, there are a lower probability $P_*(A)$ which describes a degree of belief that the conclusion belongs to a set A, an upper probability $P^*(A)$ which describes a plausibility that the conclusion belongs to the set A, a degree of doubt $D(A)$ which describes the degree of belief that the conclusion does not belong to the set A, a degree of ignorance $U(A)$ which describes an ignorance to whether or not the conclusion belongs to the set A and the like. These values are displayed for the user as the final or intermediate conclusion. However, since these values are displayed to the user as numerical values, it is difficult for the user to make a total judgement from these values, and the conclusion is insufficiently informed to the user.

SUMMARY OF THE INVENTION

Accordingly, it is a general object of the present invention to provide a novel and useful inference system in which the problems described heretofore are eliminated.

Another and more specific object of the present invention is to provide an inference system comprising an input part for entering data to be used for making an inference, a data storage part for storing data showing a possibility of a conclusion depending on the data entered from the input part, an inference part for making an inference by eliminating a degree of fuzziness of the conclusion by use of the data entered from the input part, and an output part for outputting the conclusion obtained from the inference part, where the inference part converts the data obtained from the data storage part into Dempster-Shafer's basic probability assignment data in making the inference. According to the inference system of the present invention, it is possible to distinguish the degree of ignorance and the degree of belief because the inference is made according to the Dempster-Shafer theory. In addition, since data is converted into the Dempster-Shafer's basic probability assignment to be used for the Dempster-Shafer's inference, the fuzzy information can be easily subjected to digitization, and it is possible to provide knowledge in a form which may be easily understood by the user thereby improving the operability of the inference system.

Still another object of the present invention is to provide an inference system further comprising a question generating part for generating a question and a question selection part for selecting a question to be generated from the question generating part. The input part enters an answer to the question generated by the question generating part, the data storage part stores data showing a possibility of a conclusion depending on the answer entered from the input part, the question selection part selects the question to be generated from the question generating part depending on the conclusion obtained from the inference part, and the output part outputs at least the conclusion obtained from the inference part. The question generating part generates only the question selected by the question selection part after the answer is entered from the input part. According to the inference system according to the present invention, only the valid or effective questions are generated so as not to generate an unnecessary or ineffective question. As a result, the burden on the user who must answer the question is considerably reduced.

A further object of the present invention is to provide an inference system further comprising a data converting part for converting the conclusion obtained from the inference part into data having a predetermined form for being outputted by the output part, where the output part comprises a display part for making a graphic display of the conclusion which is obtained from the inference part through the data converting part. According to the inference system according to the present invention, the user can grasp the conclusion of the inference at a glance, and the user can easily understand the relationships and ratios of various data from the graphic display.

Other objects and further features of the present invention will be apparent from the following detailed description when read in conjunction with the accompanying drawings.

BRIEF DESCRIPTION OF THE DRAWINGS

FIG. 3 shows a knowledge data table used in a knowledge data converting part shown in FIG. 2;

FIG. 8 shows a possibility deriving table used in the knowledge data converting part shown in FIG. 2;

FIG. 9 shows a pseudo possibility distribution table obtained in the knowledge data converting part shown in FIG. 2;

FIG. 10A shows a process of converting data in the pseudo possibility distribution table into a list of bit sequence and basic probability assignment within the knowledge data converting part shown in FIG. 2;

FIG. 10B shows the conversion of the data in accordance with the process shown in FIG. 10A;

FIG. 13 shows a process of displaying a message explaining a reason why a conclusion and prominent candidates are derived;

FIG. 14 shows a process of making an inference for a second time by backtracking;

FIG. 17 shows an embodiment of data stored in a corresponding data storage part of the second embodiment;

FIGS. 26A through 26C and FIGS. 27A through 27C respectively show possibility distributions of possible questions for explaining the operation of the knowledge based system shown in FIG. 25;

DETAILED DESCRIPTION

First, a description will be given on a first embodiment of the inference system according to the present invention, by referring to FIG. 1. In the present embodiment, it will be assumed for convenience sake that a user thinks of an animal and the inference system infers the animal thought of by the user and displays the inferred animal name by making the user enter answers to questions generated by the inference system. The animal though of by the user will hereinafter simply be referred to as "animal in mind".

Figure 1:
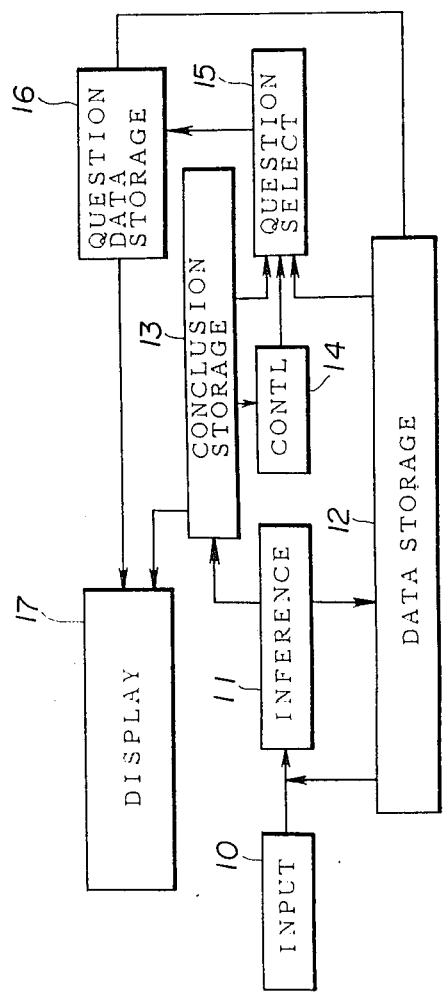
FIG. 1 is a system block diagram showing a first embodiment of the inference system according to the present invention.

In FIG. 1, the inference system comprises an input part 10, an inference part 11, a corresponding data storage part 12, a conclusion storage part 13, a control part 14, a question selection part 15, a question data storage part 16 and a display part 17. The input part 10 is constituted by a keyboard, tablet or the like for use by the user for entering data. The display part 17 is constituted by a cathode ray tube (CRT) or the like for displaying messages and questions generated by the inference system, answers entered by the user and the like.

First, a message is displayed on the display part 17 asking the user to think of a Mammalia because the inference system will guess the animal in mind. When the user thinks of a Mammalia and pushes a start button (not shown) of the input part 10, a first question is read out from the question data storage part 16 and is displayed on the display part 17. For example, this first question will read something like "Does the animal climb a tree? and "Is the animal bigger than human?". For example, four possible answers to this first question are simultaneously displayed on the display part 17 together with the first question. These four answers are "1. Yes", "2. No", "3. Either" and "4. Unknown".

When the user selects an answer out of the four possible answers and enters the selected answer from the input part 10, the inference part 11 reads out from the corresponding data storage part 12 possibility distribution data corresponding to the entered answer, and makes an inference for obtaining a conclusion. This inference is made by converting the possibility distribution data from the corresponding data storage part 12 into Dempster-Shafer's basic probability assignment data and restricting the fuzziness of the conclusion according to the Dempster-Shafer theory.

The conclusion obtained from the inference part 11 is stored in the conclusion storage part 13, and the question selection part 15 selects a second question which is to be generated next depending on the conclusion stored in the conclusion storage part 13. The selected second question is read out from the question data storage part 16 and is displayed on the display part 17 together with the possible answers. Hence, the user again selects an answer to the second question and enters the selected answer from the input part 10.

When a final conclusion is obtained after successively generating questions based on the answers entered by the user, this final conclusion is displayed on the display part 17. For example, the final conclusion displayed on the display part 17 states "The animal you are thinking of is probably sea lion".

In addition, various other displays are made on the display part 17 also during intermediate stages before the final conclusion is reached. For example, such other displays include a list of the questions generated by the inference system and the corresponding answers entered by the user up to a present stage, the names of all of the animals having the possibility that it is the animal in mind according to an inference made up to the present stage and the like. Of course, it is possible to display the names of only predetermined ones of these animals. For example, it is also possible to display only the names of those animals having no possibility that it is the animal in mind according to the inference made up to the present stage. In a stage where the inference is being made, a message may be displayed to indicate that the inference system is thinking. Further, when there are too many candidates having a high possibility that it is the animal in mind, a message may be displayed to indicate that the inference system still has no idea on the animal in mind.

Moreover, the final conclusion may be a list of a plurality of candidates or a list of those candidates having a high possibility that it is the animal in mind.

It is of course possible to display the questions and corresponding answers entered up to the present stage and make the user change one or a plurality of answers he has already entered, so that his answers become logical.

Furthermore, it is possible to display a message stating the reason why such a question was generated or a message stating the reason why such a conclusion was reached. For example, the reason why the question was generated may be that certain animals remain as candidates and the question is intended to distinguish those animals having a high possibility that it is the animal in mind.

Figure 2:
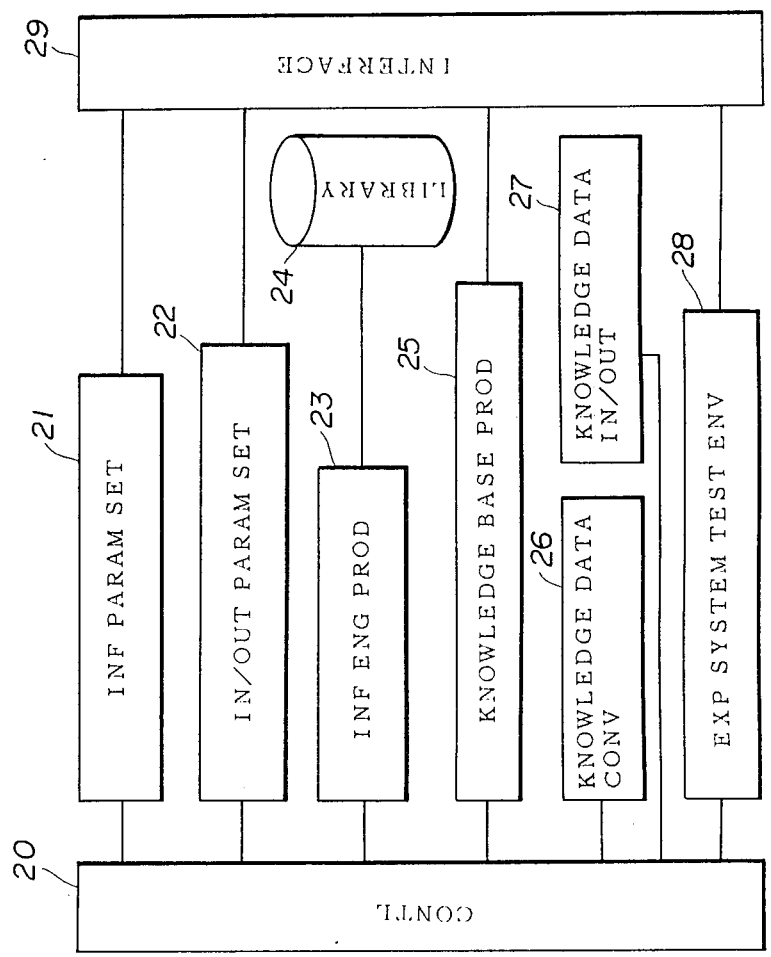
FIG. 2 is a system block diagram showing an embodiment of a knowledge processing apparatus applied with the first embodiment.

FIG. 2 shows an embodiment of a knowledge processing apparatus applied with the first embodiment of the inference system according to the present invention. As shown in FIG. 2, the knowledge processing apparatus comprises a system control part 20, an inference parameter setting support 21, input/output parameter setting support 22, an inference engine producing part 23, a library 24, a knowledge base producing support 25, a knowledge data converting part 26, a knowledge data input/output part 27, an expert system test environment 28 and a user interface 29.

The inference parameter setting support 21 is an inference parameter input support for guiding the setting of the inference engine parameters such as threshold values for judging the end of the inference made by the knowledge processing apparatus or for classifying sets of candidates of conclusions (hereinafter simply referred to as candidate sets) during the inference, a switching for determining whether or not to repeat the inference process and the like.

For example, the threshold values of an upper probability $P^*(A)$ describing the degree of plausibility that the conclusion belongs to the set A and a lower probability $P_*(A)$ describing the degree of belief that the conclusion belongs to the set A may be given as three groups, namely, an initial threshold value, a final threshold value and an increment step. Hence, the threshold values may be changed according to the progress of the inference in correspondence with the number of questions which are generated. The knowledge processing apparatus can compare the threshold values which may be defined by the user of the tool (system builder) and the values of the upper and lower probabilities so as to judge the end of the inference and classify the candidates into prominent candidate, somewhat prominent candidate and the like. In addition, the threshold values may be changed depending on the number of questions which are generated.

The input/output parameter setting support 22 guides the setting of a conclusion display pattern, input format and the like by the user. The conclusion display pattern is a character sequence which may include a special conversion symbol, and is similar to a format designation pattern of a common program language. The conclusion display pattern can describe by the conversion symbol the designation of either the display of the candidates of the conclusion by inserting "or" between the candidates or by inserting "and" between the candidates, for example. The input format is selected from numeric entry, character sequence entry and the like. In addition, the input/output parameter setting support 22 can also set a sentence for the message output. In other words, it is possible for the user to set the input/output parameters such as the conclusion display pattern and the input format.

The inference engine producing part 23 is a functional part for assembling an inference engine from the library 24 under the parameters set by use of the inference parameter setting support 21 and the input/output parameter setting support 22.

The knowledge base producing part 25 is a knowledge base editor which can enter the knowledge in a form of a table shown in FIG. 3. FIG. 3 shows a table containing the knowledge used for guessing the animal in mind. As shown in FIG. 3, each animal candidate is classified into five levels, where a double circular mark denotes a "yes" which is strongly anticipated and almost only allows a "yes", a single circular mark denotes a "yes" which is anticipated but may allow an "either", a triangular mark denotes an "either" which is anticipated but may allow a "no" or a "yes", a cross mark denotes a "no" which is anticipated but may allow an "either", and an asterisk mark denotes a "no" which is strongly anticipated and almost only allows a "no".

Accordingly, the knowledge base producing support 25 displays the attribute and the like of the subject having values in several stages in a form of a two-dimensional table having the attribute and the like and the candidate of the subject for the xy coordinates. The entry of the knowledge can be carried out by making or revising the two-dimensional table.

In the knowledge processing apparatus, the inference engine produced in the inference engine producing part 23 and the knowledge base produced in the knowledge base producing support 25 constitute a pair which can function independently as a single knowledge base system.

The knowledge data converting part 26 converts the data in the form of the table produced in the knowledge base producing support 25 into data for Dempster-Shafer's inference.

Generally, when a candidate set and size thereof are respectively denoted by $\theta$ and n in obtaining a value of an unknown by an inference, $2^n$ data are necessary to describe the basic probability assignment function which are the basic data for the Dempster-Shafer's inference since the basic probability assignment function is a function of $\theta$ from a power set $2^\theta$ to a closed interval [0, 1]. This is the main reason why the Dempster-Shafer's inference is only applicable to a small-scale system. But in actual practice, it is sufficient to hold as data only a focal with (subset of $\theta$ assigned with a basic probability a value other than 0) and a value of the basic probability with respect to the focal element. This is because other data are described as sums under a predetermined condition of the basic probability and those having the basic probability of 0 can be neglected.

The focal element may be described by use of a list because the focal element is a subset of $\theta$, but additional processes will be required in this case since the description by the list is not unique. For example, a set describing a list (a b) and a set describing a list (b a) are identical, however, the two lists are different. For this reason, the basic probability assigned to the list (a b) and the basic probability assigned to the list (b a) may be given or calculated independently as a matter of form. In such a case, it is necessary to unify the two basic probabilities.

Figure 4A:
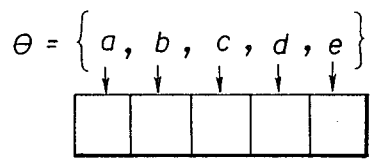
FIGS. 4A and 4B show the correspondence of sets and bit sequences.
Figure 4B:
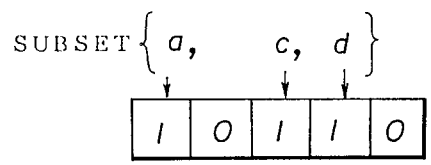

On the other hand, when the description of the set is unique, there is no need for such an unification process. The description of the set becomes unique if the elements of the candidate set $\theta$ were arranged according to a certain sequence and fixed, and the subset is also arranged according to the same sequence. However, the utilization efficiency of the storage area (or memory capacity) is poor when the focal element is described by the list. Hence, the storage area can be utilized more efficiently by making the candidate set $\theta$ and the subset correspond to bit sequences as shown in FIGS. 4A and 4B, respectively.

According to the knowledge processing apparatus, it is possible to describe the basic probability assignment (or basic probability distribution) by the list or table containing pairs each made up of the unique description of the focal element and the corresponding value of the basic probability of the focal element, by use of a unique description which is prime and disjunctive such as "The value of the data is XXX" or "The value of the data is XXX or OOO". As described before, the bit sequence is used as a unique description of the prime and disjunctive statement related to the value of the subject data.

Next, a description will be given on the description of the set by use of the bit sequence.

Figure 5:
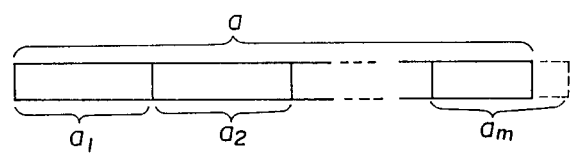
FIG. 5 show a bit sequence of a set.

First, a bit sequence a corresponding to the set A is sectioned for every predetermined length, and an i-th sectioned portion of the bit sequence a is denoted by $a_i$ for convenience sake. Hence, as shown in FIG. 5, the bit sequence a is made up of sectioned portions $a_1$ through $a_m$. In FIG. 5, a portion indicated by a phantom line subsequent to the sectioned portion $a_m$ is filled with 0. Although not shown, the bit sequence b corresponding to the set B is similarly sectioned such that $b = b_1, b_2, \ldots, b_m$.

FIGS. 6A through 6D show flow charts for explaining an internal process of the inference part 11.

Figure 6A:
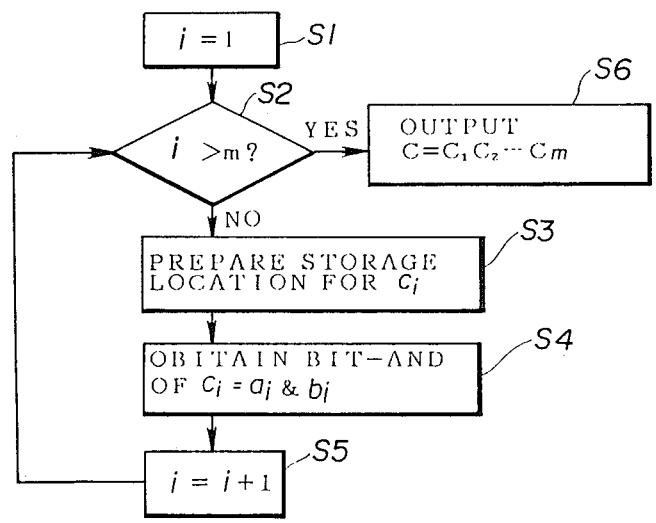
FIG. 6A is a flow chart for explaining a process of obtaining $A \cap B$ from two sets A and B.

$C = A \cap B$ is obtained from a process shown in FIG. 6A. In FIG. 6A, a step S1 sets i to 1, and a step S2 discriminates whether or not i is greater than m. When the discrimination result in the step S2 is NO, a step S3 prepares a storage location for $c_i$. A step S4 obtains $c_i$ by taking an AND of bits of $a_i$ and $b_i$. A step S5 increments i, and the process is returned to the step S2. When the discrimination result in the step S2 becomes YES, a step S6 outputs $C = c_1, c_2, \ldots, c_m$.

Figure 6B:
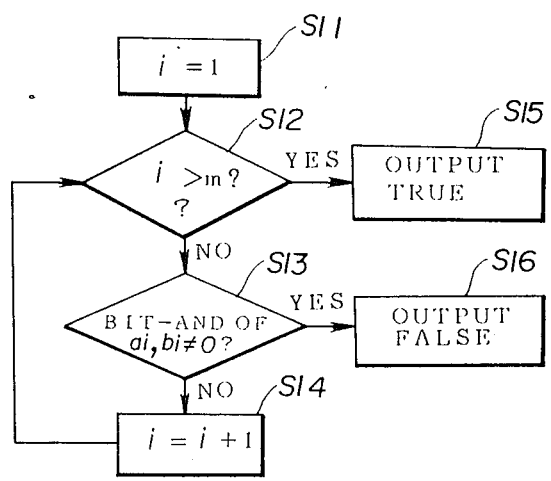
FIG. 6B is a flow chart for explaining a process of evaluating $A \cap B = \phi$ from the two sets A and B.

An evaluation of $A \cap B = \phi$ is made by a process shown in FIG. 6B. in FIG. 6B, a step S11 sets i to 1, and a step S12 discriminates whether or not i is greater than m. When the discrimination result in the step S12 is NO, a step S13 discriminates whether or not an AND of bits of $a_i$ and $b_i$ is not 0. When the discrimination result in the step S13 is NO, a step increments i, and the process is returned to the step S12. On the other hand, when the discrimination result in the step S12 is YES, a step S15 outputs "True". A step S16 outputs "False" when the discrimination result in the step S13 is YES.

Figure 6C:
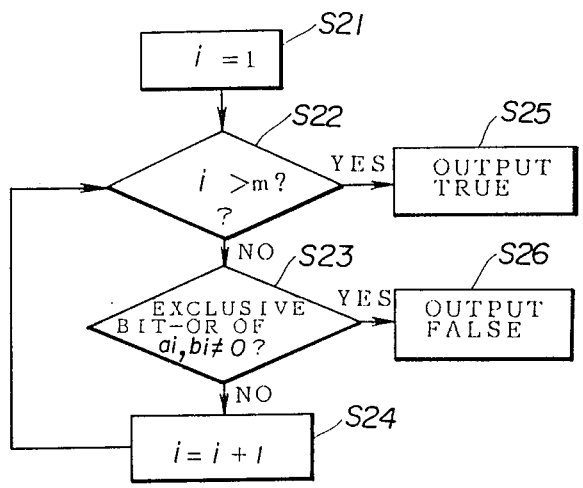
FIG. 6C is a flow chart for explaining a process of evaluating $A = B$ from the two sets A and B.

An evaluation of A = B is made by a process shown in FIG. 6C. In FIG. 6C, a step S21 sets i to 1, and a step S22 discriminates whether or not i is greater than m. When the discrimination result in the step S22 is NO, a step S23 discriminates whether or not an exclusive-OR of bits of $a_i$ and $b_i$ is not 0. When the discrimination result in the step S23 is NO, a step S24 increments i, and the process is returned to the step S22. On the other hand, when the discrimination result in the step S22 is YES, a step S25 outputs "True". A step S26 outputs "False" when the discrimination result in the step S23 is YES.

Figure 6D:
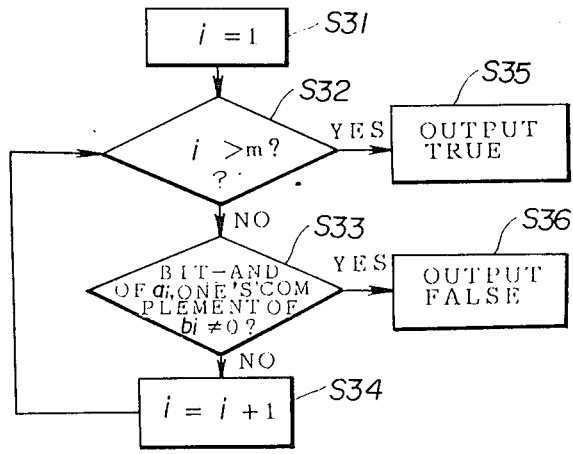
FIG. 6D is a flow chart for explaining a process of evaluating $A \subset B$ from the two sets A and B.

Furthermore, an evaluation of $A \subset B$ is made by a process shown in FIG. 6D. In FIG. 6D, a step S31 sets i to 1, and a step S32 discriminates whether or not i is greater than m. When the discrimination result in the step S32 is NO, a step S33 discriminates whether or not an AND of bits of $a_i$ and one's complement of $b_i$ is not 0. When the discrimination result in the step S33 is NO, a step S34 increments i, and the process is returned to the step S32. On the other hand, when the discrimination result in the step S32 is YES, a step S35 outputs "True". A step S36 outputs "False" when the discrimination result in the step S33 is YES.

Therefore, the four basic set operations necessary for the Dempster's combination rule can be carried out with extreme ease. When these four basic set operations are carried out, the calculation of a lower probability Cr (or Bel) and an upper probability Pl (or P*) from the the basic probability assignment and the combination of the basic probability assignment can be obtained from the following.

$$Cr(A) = \sum_{B \subset A} m(B)$$

$$Pl(A) = \sum_{B \cap A \neq \phi} m(B)$$

However, in the case where $A = \{\alpha\}$ (singleton), Cr can be obtained solely by search and the value of Pl can be obtained easily at a high speed as a sum of the basic probabilities of the focal elements including $\alpha$, because of the following.

$$Cr(A) = \sum_{B \subset A} m(B) = m(A)$$

$$Pl(A) = \sum_{B \cap A \neq \phi} m(B) = \sum_{\alpha \in B} m(B)$$

When $\alpha$ is a k-th element of $\theta$, Pl is a sum of the basic probabilities of the such focal elements that the k-th bit of the corresponding bit sequence is ON.

Figure 7:
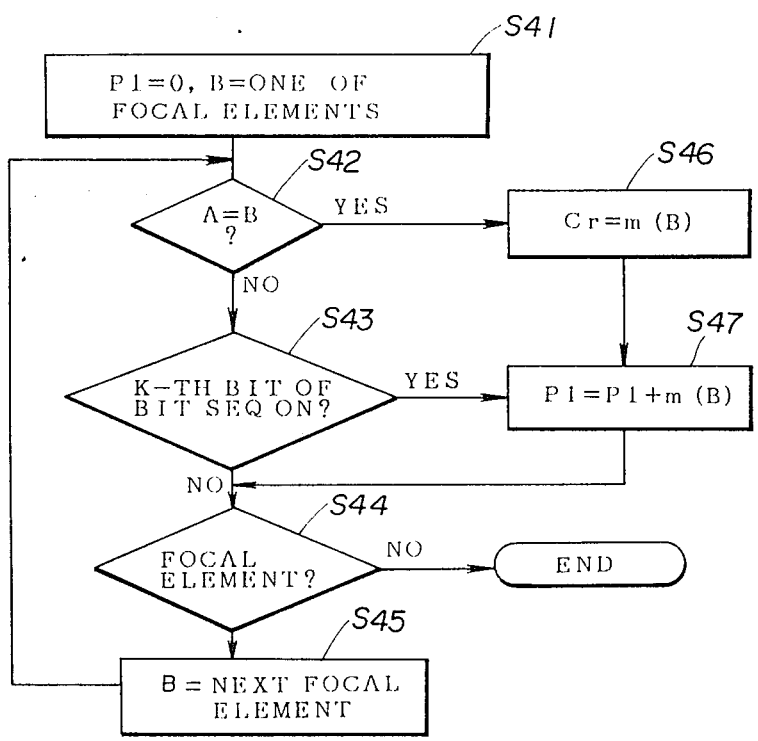
FIG. 7 is a flow chart for explaining a process of obtaining a lower probability Cr.

FIG. 7 shows an internal process of the inference part 11 for obtaining Cr. In FIG. 7, a step S41 sets Pl to 1 and sets B to one of the focal elements, and a step S42 discriminates whether or not A=B. When the discrimination result in the step S42 is NO, a step S43 discriminates whether or not the k-th bit of the bit sequence describing B is ON. When the discrimination result in the step S43 is NO, a step S44 discriminates whether or not a focal element still remains. When the discrimination result in the step S44 is YES, a step S45 sets B to a next focal element, and the process is returned to the step S42. On the other hand, a step S46 sets Cr to m(B) when the discrimination result in the step S42 is YES, and a step S47 sets Pl to Pl+m(B) when the discrimination result in the step S43 is YES. The process is ended when the discrimination result in the step S44 is NO. According to this process shown in FIG. 7, it is possible to obtain at a high speed the upper and lower probabilities from the basic probability assignment which is described by use of the bit sequence.

In the case where the information subjected to the combination contradict, it is possible not to end the inference as being a failure but to assign 0 to all of the probabilities so that the user may carry out a process of removing the contradictions.

Depending on the size of the candidate set of the values of the subject data, the length of the bit sequence may first be adjusted and use the bit sequence having the adjusted length to describe the basic probability assignment. In this case, the upper and lower probabilities can be obtained from the basic probability assignment by subjecting the basic probability assignment to the Dempster's rule of combination.

Returning now to the description of FIG. 2, the knowledge data converting part 26 obtains a pseudo possibility distribution table shown in FIG. 9 from the knowledge data table shown in FIG. 3 and a possibility (membership value) deriving table shown in FIG. 8. The possibility deriving table shown in FIG. 8 shows in accordance with the classified levels used in the knowledge data table shown in FIG. 3 the possibility that the conclusion will be the animal when "yes", "no", "either" and "unknown" are entered as the answer to the question.

The pseudo possibility distribution table shown in FIG. 9 shows the possibility that the conclusion will be the animal when "yes", "no", "either" and "unknown" are entered as the answer to the question. The pseudo possibility distribution table can be obtained by use of at least one of the data (knowledge data table) having values of several stages describing the attribute and the like of the subject, the weight of the question related to the attribute and the like of the subject and the possibility deriving table. The data in the pseudo possibility distribution table may be changed depending on the weight given to each candidate of the subject. Hence, the data in the pseudo possibility distribution table may be finely adjusted depending on the weight along the xy coordinates of the table. In addition, it is possible to change the data in the pseudo possibility distribution table by use of a knowledge which is written in an "IF ..., THEN ..." rule format and is provided exclusively for changing the pseudo possibility distribution table. In other words, specific data may be designated and revised according to the "IF ..., THEN ..." rule format.

Next, the knowledge data converting part 26 converts the data in the pseudo possibility distribution table into a list of pairs each made up of the bit sequence and the basic probability value in accordance with a process shown in FIG. 10A. In FIG. 10A, a step S51 revises the data depending on the degree of credibility, a step S52 normalizes the data as a fuzzy set, and a step S53 slices the distribution horizontally along a membership value.

FIG. 10B shows the conversion of the data in accordance with the process shown in FIG. 10A. For example, when the degree of credibility of a data DATA1 is 0.9, the data DATA1 is revised into a data DATA2 in the step S51 depending on the degree of credibility. This data DATA2 is converted into a data DATA3 in the step S52 by being normalized as a fuzzy set. This data DATA3 is further converted into a data DATA4 in the step S53 by being sliced horizontally along the membership value. Accordingly, it is possible to obtain through calculation the basic probability assignment from the degree of credibility or weight of the data in the pseudo possibility distribution table.

The knowledge data input/output part 27 is an input/output part for the knowledge data to carry out the so-called load and save operations.

The expert system test environment 28 is a test environment for refining the knowledge of an expert system which will be described later in conjunction with FIG. 11.

The total control part 20 controls the functions of all of the parts shown in FIG. 2. The user interface 29 is an interface for use by the user and usually comprises an output device such as a CRT and an input device such as a keyboard and a mouse.

In the case where the table produced by the knowledge base producing support 25 cannot be displayed in its entirety on a display screen of the user interface 29, a portion of the table is displayed. The entire table can be made by moving the displayed portion vertically and horizontally. In other words, the portion of the table can be displayed on the display screen having a limited display area and the displayed table can be made or revised by changing the candidates of the subject, the attributes and the like.

Figure 11:
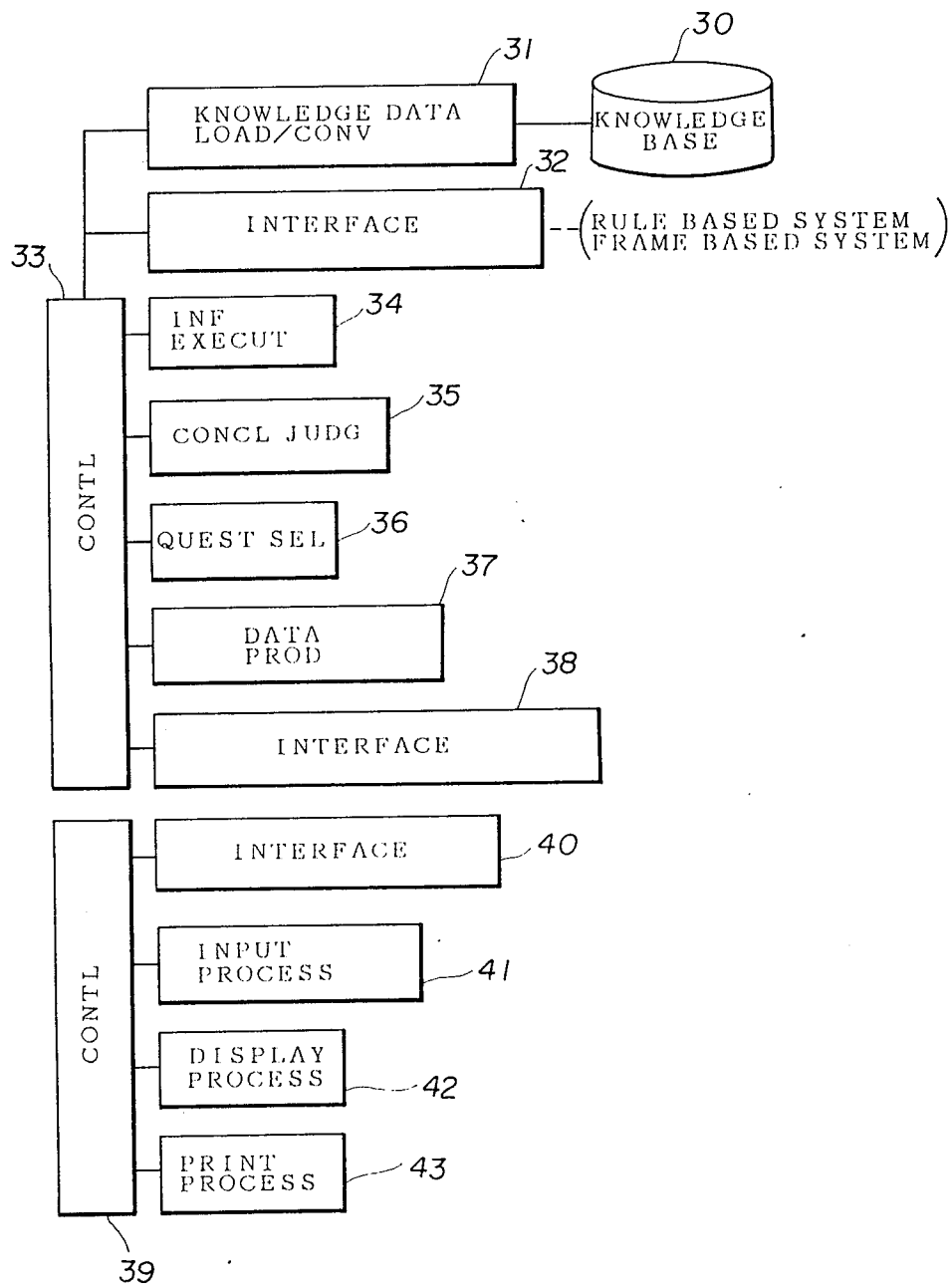
FIG. 11 is a system block diagram showing an embodiment of an expert system applied with the first embodiment.

The library 24 is a collection of small parts making up the expert system shown in FIG. 11, and is used to produce the inference engine of the expert system.

FIG. 11 shows an embodiment of the expert system made from the knowledge processing apparatus shown in FIG. 2. The expert system comprises a knowledge base 30, a knowledge data load/convert part 31, an interface 32 for coupling to other systems, an inference system controller 33, an inference execution part 34, an inference conclusion judging part 35, a question selection part 36, explaining data producing part 37, an interface 38 for input/output interface with the user, input/output system controller 39, interface 40 for interface with the inference system, a user input processing part 41, a display processing part 42 and a print processing part 43.

The user input processing part 41 corresponds to the input part 10 shown in FIG. 1, and the inference execution part 34 corresponds to the inference part 11. The inference conclusion judging part 35 corresponds to the control part 14, and the question selection part 36 corresponds to the question selection part 15. The display processing part 42 corresponds to the display part 17.

In the expert system shown in FIG. 11 which is a knowledge based system, data normally obtained by a data conversion from a rule based system or a frame based system and data obtained collectively from an entry made by the user are considered to be data known to the expert system, and the inference is carried out by use of the known data. Thereafter, the lack of information is supplemented by asking the user a question and obtaining an answer thereto, or all of the information may be obtained by questioning the user when no known knowledge exists. The guessing of the animal in mind is an example of the latter case.

Hence, the expert system comprises inference means for making an inference by use of an evidence known to the system when making an inference on a subject, and a question is generated thereafter according to the needs so as to supplement information from an answer to the question.

The input information can be obtained from the fact data in the rule based system and the frame data of the frame based system. On the other hand, the conclusion may be converted into the fact data or the frame data.

In the case where the expert system is applied to a trouble diagnosis system, there may be a test which is known to have a big effect on the narrowing down of the trouble but would rather not use if possible because of the high cost involved. A question involving a high cost may mean that the question would involve extensive time and effort to answer. In other words, the question involving the high cost is difficult to answer. According to the present expert system, the result of such a test is entered in the form of an answer to a question. For this reason, when describing such a test, it is possible to describe the test by the cost which will be involved in addition to the weight of question dependent on the degree of credibility of the information, so as to describe the test by two classes. The division into the classes is made by the user. When guessing the animal in mind, it is most desirable to avoid a direct question like "Is the animal a cross between a horse and a donkey?", and this kind of a question is considered as a test involving a high cost.

Accordingly, the questions are grouped depending on each case such as when permitted to ask an ordinary question involving a low cost, distinguishing two most prominent candidates, an ordinary question unlikely to help the inference, the maximum number of questions which may be asked is reached and the like. The handling of the questions involving the high cost may be changed depending on the case.

The Dempster-Shafer's inference is effective when the inference involves determination of an unknown from pieces of fuzzy information. Hence, there is no effective method of uniformly handling syllogism, but the following three methods can be considered for use in handling syllogism.

(1) A first method calculates the degree of belief of the conclusions in multiple stages from some kind of a formula, based on the upper and lower probabilities and the basic probability assignment. In this case, it is inevitable that the degree of uncertainty increases with each stage.

(2) A second method applies the syllogism on the assumption that a conclusion is fixed for each stage under an appropriate threshold value. In this case, it is necessary to complete the knowledge so that the conclusion can be fixed.

(3) A third method continues the inference independently for each of a plurality of prominent candidates by assuming each prominent candidate to be fixed when the plurality of prominent candidates remain. In this case, it takes time to reach the final conclusion.

In the present expert system, the inference means recursively uses the Dempster-Shafer's inference for the second method. Due to the characteristic of the Dempster-Shafer's inference which determines an unknown, the chain of multiple stages becomes a backtracking inference which determines an unknown to determine another unknown.

Furthermore, in the present expert system, when the conclusion is not unique, an independent hypothesis world is made for each of the prominent candidates which are assumed to be correct and the inference is continued independently for each hypothesis world for the third method. Hence, in the present expert system, the Dempster-Shafer's inference is used for obtaining certainty from uncertainty.

According to the embodiment described heretofore, the Dempster-Shafer's inference is used to determine the value of the data subject to the inference. For this reason, based on the Dempster-Shafer's inference, it is possible to distinguish the degree of ignorance and the degree of belief, and also describe lack of information and a quantity of contradiction. Furthermore, by obtaining the evidence according to the Dempster's rule of combination, it becomes possible to handle the fuzzy information in a form close to the user's senses.

When giving a question to the user, it is possible to calculate by normalization an entropy of fuzzy division which is made depending on the answers to the generated questions, and select as the next question to be generated a question which will make the calculated entropy a maximum. By avoiding unnecessary questions in this manner and efficiently selecting the questions, it is possible to reduce the burden on the user.

Figure 12:
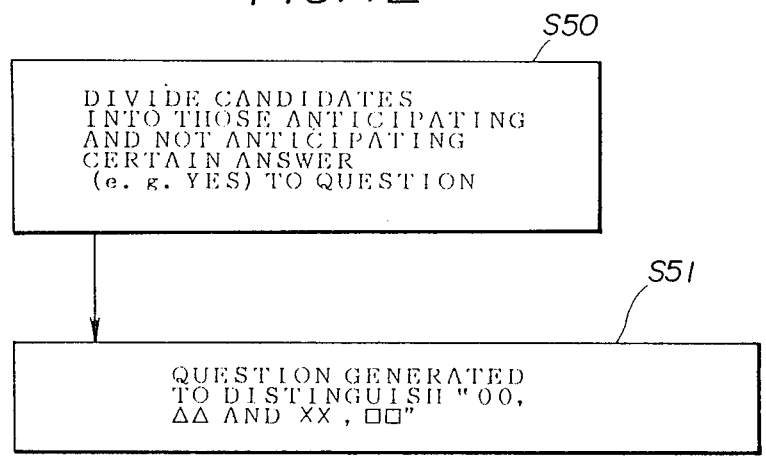
FIG. 12 shows a process of displaying a message explaining a reason why a question is selected.

It is possible to display the reason why the question was selected. FIG. 12 shows an embodiment of the process for displaying a message explaining the reason why the question was selected. As shown in FIG. 12, out of the plurality of candidates for the conclusion, a step S50 divides the candidates into those which anticipate a certain answer (for example, a "yes") to a question and those which do not, and and a step S51 displays that the question was generated to distinguish the candidates into two kinds.

In the case where the questions are selected from a plurality of questions having high priorities and the first question having the highest priority is generated, it may be difficult for the user to answer the question or the user may elect not to answer the question. In this case, the second question having the second highest priority is generated. If the user wishes not to answer this question, the third question having the third highest priority is similarly generated. When no other selected question remains, it is possible to generate the first question again or attempt to select a question from non-selected questions. In this case, it is possible to display a plurality of questions and make the user select from these questions. Therefore, the user may select those questions which are easy to answer, and the selection of the questions is simplified.

When displaying the conclusion, it is possible to obtain the upper and lower probabilities or values of the subject for each candidate of the conclusion and assign a sequence from a largest of the upper and lower probabilities and a sum thereof, and then display a number in the large region together with the upper and lower probabilities. Furthermore, it is possible to display all of these in a form of a graph. It is possible to display a part of the candidates on the display screen together with the upper and lower probabilities or the graph thereof, and make it possible to look at each candidate by changing the kind of candidates to be displayed.

The display of the conclusion may be made according to methods other than those described before depending on the tendencies of the values of the upper and lower probabilities, the number of prominent candidates and the designation made by the user. For example, the display of the conclusion may be the names of prominent candidates, only the number of candidates, candidates having no possibilities and the like. The display of the conclusion may be changed arbitrarily between such methods according to the needs.

After the end of the inference or during the inference, it is possible to display the questions generated up to the present, the corresponding answers entered and the answers anticipated for each prominent candidate when the user asks the reason for the conclusion or the selection of the prominent candidates. FIG. 13 shows an embodiment of the process for displaying a message explaining the derivation of the conclusion and the prominent candidates. In other words, as shown in FIG. 13, a step S60 looks into the history of question and answers to compare the actual answers entered and the anticipated answers, and a step S61 divides the entered answers into ranks depending on the difference between the actual and anticipated answers. A step S62 displays the actual answers entered and the anticipated answers for comparison purposes. On the other hand, when the user asks the reason why a certain candidate is no longer prominent, it is possible to explain the reason by similarly comparing the actual answers entered and the anticipated answers. Accordingly, it is possible to design with a large degree of freedom the display part for displaying the kind at the end of the inference or during the inference.

In addition, it is possible to look into the history and backtrack to a predetermined position so as to make an inference for the second time as shown in FIG. 14. FIG. 14 shows an embodiment of the process of the control part 14 for making the inference for the second time. A step S70 looks into the history of questions and answers and backtracks to a desired question, and a step S71 carries out the calculation for the second time. Therefore, after the question is generated and the corresponding answer is entered, for example, it is possible to make an inference again by backtracking to the previous question. By taking such a measure, it is possible to correct an error in the entry made by the user, and the debugging is facilitated in that it is possible to check the change in the conclusion due to the change in the answer.

The first embodiment of the inference system described heretofore comprises input means (10) for entering data to be used for making an inference, data storage means (13) for storing data showing a possibility of a conclusion depending on the data entered from the input means, inference means (11) for making an inference by eliminating a degree of fuzziness of the conclusion by use of the data entered from the input means, and output means (17) for outputting the conclusion obtained from the inference means, where the inference means converts the data obtained from the data storage means into Dempster-Shafer's basic probability assignment data in making the inference.

Therefore, according to the present embodiment, the following advantages are obtainable.

Firstly, the required storage area (or memory capacity) is small because the focal element is uniquely described by the bit sequence.

Secondly, the storage area is utilized efficiently by adjusting the length of the bit sequence.

Thirdly, since the knowledge is entered in the form of a two-dimensional table, it is easy to describe the knowledge. In addition, the flexibility of the knowledge entry is ensured. The entry of the knowledge may be made from other systems, and the expert system may be used as an external system to other systems.

Fourthly, even in the case where an extremely large table must be produced for the inference according to the general method, it is possible to describe the table as combinations of small knowledge tables by setting classifications.

Therefore, the expert system applied with the first embodiment of the inference system is flexible in system design and is capable of obtaining a conclusion of a high reliability.

Figure 16:
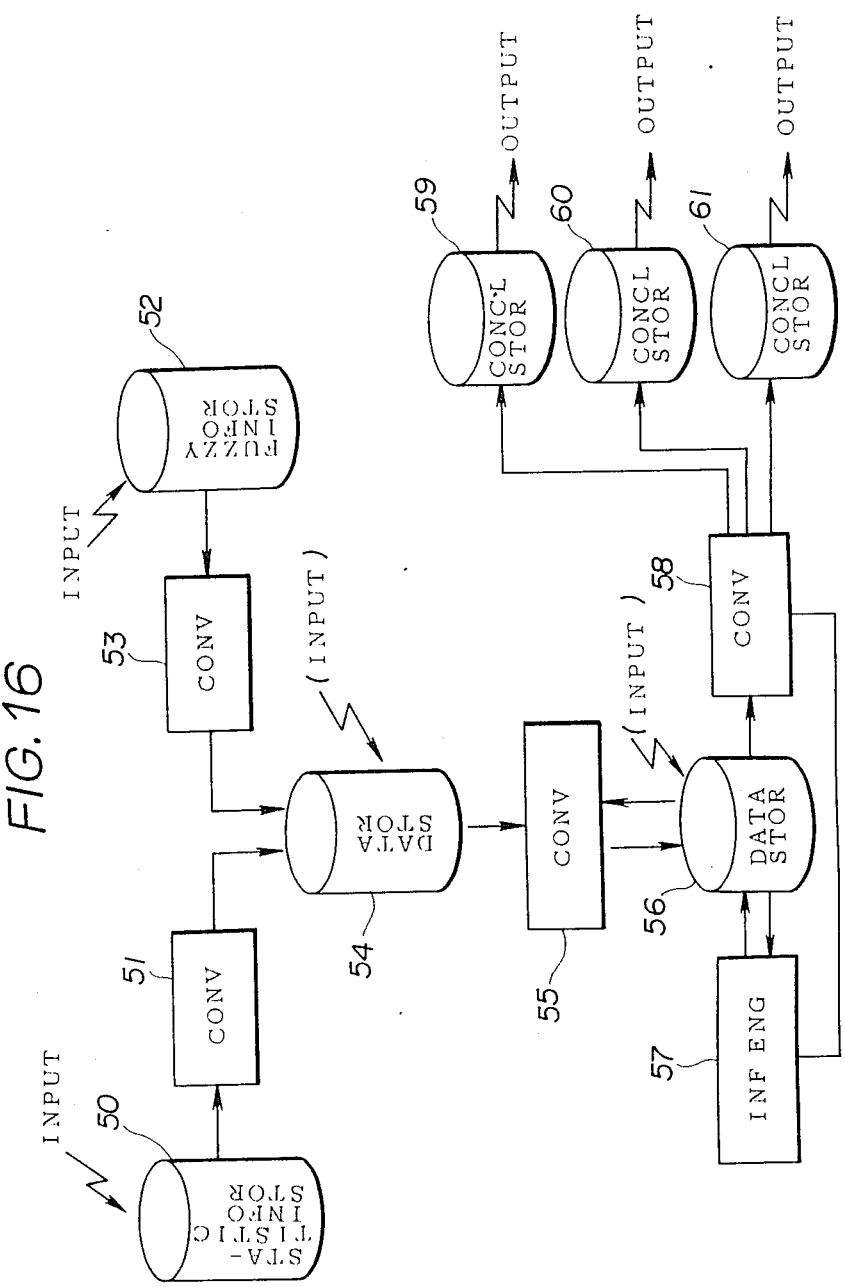
FIG. 16 is a system block diagram showing an essential part of the second embodiment.

Next, a description will be given on a second embodiment of the inference system according to the present invention, by referring to FIG. 16. In FIG. 16, those parts which are the same as those corresponding parts in FIG. 1 are designated by the same reference numerals, and a description thereof will be omitted.

The present embodiment uses the Dempster-Shafer theory to process the fuzzy knowledge. As shown in FIG. 16, the inference system comprises a statistics information storage part 50 which stores a probability distribution data entered by the user or another machine. The probability distribution data is often an insufficient statistics information, and is converted into a possibility distribution data in a converter 51. The possibility distribution is equivalent to the membership function of the fuzzy set. In other words, the insufficient statistics information is converted into a fuzzy set data. The following function may be used for converting the insufficient statistics information into the fuzzy set data, where Prob(x), Prob(y) and Poss(x) respectively denote the probability of a statement x, a probability of a statement y and a possibility of the statement x.

$$Poss(x) = \sum_y \min\{Prob(x), Prob(y)\}$$

The fuzzy set data obtained by the conversion in the converter 51 is stored in a data storage part 54 in a form of a possibility distribution data.

On the other hand, the present embodiment also comprises a fuzzy information storage part 52 for storing verbally fuzzy information including fuzzy quantifiers such as "virtually" and "little". The verbally fuzzy information is also entered into the fuzzy information storage part 52 by the user or another machine. The verbally fuzzy information is converted into a possibility distribution data, that is, into a fuzzy set data, in a converter 53. For example, an isosceles triangular distribution is obtained having an extension dependent on the confidence of each information about a value set with respect to each fuzzy quantifier. The possibility distribution data obtained by the conversion in the converter 53 is also stored in the data storage part 54.

FIG. 16 shows an embodiment of an essential part of the inference system for converting the possibility distribution data into the Dempster-Shafer's basic probability assignment data. The possibility distribution data from the data storage part 54 is approximated by a finite staircase function and is then converted into the Dempster-Shafer's basic probability assignment data. The possibility distribution data is in most cases a finite staircase function to start with. The consonant sequence is effectively applied to the conversion method. That is, when the possibility distribution Poss(x) is a finite staircase function, the following family of sets obtained by slicing this finite staircase function at a value of the possibility distribution Poss(x) is finite.

$$\{\{x \mid Poss(x) \geq y\} \mid y \in [0,1]\}$$

The conversion method using the consonant sequence makes a sequence of elements of the family of sets arranged from the smallest element, that is, a consonant sequence $(s_i)^n/i=1$, and considers the set Si included in this sequence as a focal element of the Dempster-Shafer theory to give the following basic probability assignment mass(Si).

$$mass(Si) = \min_{x \in Si} Poss(x) - \min_{x \in S_{i+1}} Poss(x)$$

However, when the conversion method using the consonant sequence is used to simply convert the possibility distribution into the basic probability assignment, only the description of the fuzzy set is changed, and the processing of the fuzzy set will still be complex. Accordingly, in the present embodiment, a converter 55 shown in FIG. 16 revises the basic probability assignment data which is obtained from the possibility distribution data so that the portion indicating the degree of ignorance, that is, the assignment to the whole event, increases. For example, a predetermined coefficient such as 0.5 is multiplied to each value in the basic probability assignment, and a revision is thereafter made to add the coefficient 0.5 to the assignment to the whole event. When some kind of basic probability assignment exists after this revision, this basic probability assignment is subjected to the Dempster's rule of combination to obtain a new basic probability assignment. The basic probability assignment obtained from the converter 55 in this manner is stored in a data storage part 56 as a knowledge accompanying the basic probability assignment.

Hence, according to the present embodiment, the basic probability assignment is revised when the statistics information and the verbal information obtained from different information sources are passed through the blocks 50 through 56. As a result, the complexity of the processing which is a drawback of the fuzzy theory is eliminated.

The basic probability assignment stored in the data storage part 56 is read out to an inference engine 57 wherein the Dempster-Shafer's inference is made. The inference engine 57 carries out data verification and procedure call process similarly as in the case of an ordinary inference engine, but in the present embodiment, the process using the Dempster's rule of combination is also included in the procedure.

The basic probability assignment data stored in the data storage part 56 is also read out to a converter 58. The converter 58 obtains data related to "credibility" and "plausibility" with respect to a predetermined hypothesis on the conclusion from the basic probability assignment data. The data from the converter 58 related to the "credibility" and "plausibility" are used for the inference process in the inference engine 57 and also affects a conclusion data which is stored in conclusion storage parts 59, 60 and 61.

The conclusion storage parts 59, 60 and 61 constitute a memory part for storing the conclusion data which is obtained. The conclusion data stored in this memory part is outputted and is finally used by the person offering the knowledge, that is, the user. The conclusion data outputted from the converter 58 is stored as "degree of credibility" in the conclusion storage part 59, "degree of plausibility" in the conclusion storage part 60 and "degree of truth" in the conclusion storage part 61. The "degree of truth" is a parameter obtained by taking an arithmetic mean of the "degree of credibility" and the "degree of plausibility". When the present embodiment is applied to the expert system, for example, the data in arbitrary one or ones of the statistics information storage part 50, the fuzzy information storage part 52, the data storage part 54 and the data storage part 56 may be revised by the user when the output data of the conclusion storage parts 59, 60 and 61 is insufficient.

Figure 15:
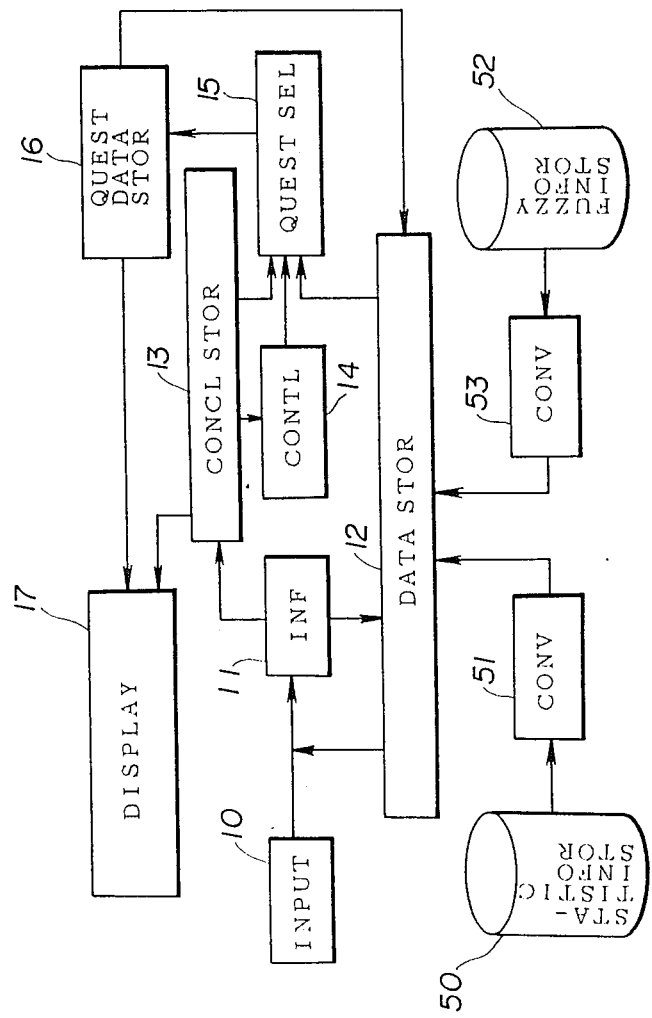
FIG. 15 is a system block diagram showing a second embodiment of the inference system according to the present invention.

In FIG. 16, the inference engine 57 corresponds to the inference part 11 shown in FIG. 15. The data storage part 54 and the converter 55 correspond to the corresponding data storage part 12. In addition, the data storage part 56, the converter 58 and the conclusion storage parts 59, 60 and 61 correspond to the inference result storage part 13.

According to the present embodiment, the fuzzy set data is converted into the Dempster-Shafer's basic probability assignment data because the fuzzy information is processed by use of the Dempster-Shafer's theory. Hence, the digitization of the fuzzy information can be made with ease, and the knowledge can be provided in a form easily understood by the user thereby improving the operability of the system. For this reason, the design of a system which uses the conclusion obtained by the inference system is facilitated. For example, the inference system can be effectively applied to a knowledge processing in various fields such as in a trouble diagnosis support system and an intention determination support system.

Next, a description will be given on a third embodiment of the inference system according to the present invention. Since the system block diagram of the first embodiment can be used to describe the present embodiment, reference will be made to FIG. 1 in describing the present embodiment.

The generated question is displayed on the display part 17, and the data or answer to the question is entered from the input part 10 by the user. As shown in FIG. 17, the corresponding data storage part 12 stores data indicating the possibility of conclusions depending on the answer entered by the user.

The inference part 11 reads out the data from the corresponding data storage part 12 depending on the user's answer entered from the input part 10, and restricts the fuzzy conclusion. The inference result storage part 13 stores the conclusion of the inference made by the inference part 11. The conclusion includes both intermediate conclusion and final conclusion.

The question selection part 15 reads out the intermediate conclusion from the inference result storage part 13 and selects the question to be generated thereafter. The question data storage part 16 stores the questions for the user for use in carrying out the inference. The control part 14 judges whether or not the final conclusion is obtained, and instructs the question selection part 15 that the selection of the question is no longer necessary when it is judged that the final conclusion is obtained.

In the present embodiment, the inference part 11, the control part 14 and the question selection part 15 are constituted by a microprocessor. On the other hand, the corresponding data storage part 12, the conclusion storage part 13 and the question data storage part 16 are constituted by a data storage device such as a random access memory (RAM), a magnetic disc and an optical disc.

In the present embodiment, the candidates of the conclusion are finite. The restriction of the fuzzy conclusion made in the inference part 11 based on the user's answer to the generated question is carried out by use of the Dempster-Shafer's basic probability assignment data. This Dempster-Shafer's basic probability assignment data is obtained based on the possibility distribution shown in FIG. 17.

The corresponding data of the user's answer (input information) and the fuzzy restriction of the conclusion constitute a table of the possibility distribution shown in FIG. 17. The possibility distribution data obtained from this table is converted into the basic probability assignment data according to the Dempster's rule of combination.

Next, a description will be given on the method of selecting the question in the question selection part 15 based on the intermediate conclusion of the inference made in the inference part 11.

When a set of the candidates of the conclusion is denoted by $\theta$ and the family of sets of the entire subsets of the set $\theta$ is denoted by $2^\theta$, the basic probability assignment on $\theta$ is a probability distribution on $2^\theta - \{\phi\}$. With respect to $\phi$, the probability distribution may be on $2^\theta$ which gives 0.

With respect to A ε $2^\theta$, a lower probability $P_*(A)$ of the set A and an upper probability $P^*(A)$ of the set A can be given by the following.

$$P_*(A) = P(\{S \varepsilon 2^\theta | S \subset A\})$$

$$P^*(A) = P(\{S \varepsilon 2^\theta | S \cap A \neq \phi\})$$

The lower probability $P_*(A)$ describes the degree of belief that the conclusion belongs to the set A, while the upper probability $P^*(A)$ describes the degree of plausibility that the conclusion belongs to the set A.

Accordingly, a ε $\theta$ with small $P^*(\{a\})$ is a candidate of non-plausible conclusion and may therefore be excluded. When the following is defined by providing an appropriate threshold value $\epsilon$, where $\theta_\epsilon$ is a crisp subset of $\theta$.

$$\theta_\epsilon = \{a \varepsilon \theta | P(\{a\}) > \epsilon\}$$

When it is assumed that the possibility distribution obtained from the question and answer is a membership function of the fuzzy subset of $\theta$, the question may be considered as a fuzzy division of $\theta$ by the answer. In FIG. 17, the division is made into four, namely, "yes", "no", "either" and "unknown". When $\theta$ is divided into n fuzzy subsets F1, F2, ..., Fn, $\theta_\epsilon$ is subjected to the fuzzy division into $\theta_\epsilon \cap$ F1, ..., $\theta_\epsilon \cap$ Fn.

A probability Pi that a variable x having a uniform probability distribution in $\theta_\epsilon$ belongs to the set Fi can be described by the following formula, where $\mu_{Fi}(a)$ denotes a membership function of Fi and $\theta_\epsilon$ denotes the power of $\theta$.

$$Pi = \sum_{a \epsilon \theta_\epsilon} \{\mu_{Fi}(a) / |\theta_\epsilon|\}$$

Accordingly, an entropy (anticipated information quantity) H of this division can be regarded as the following.

$$H = - \sum_{i=1}^{n} Pi \log Pi$$

However, because the fuzzy division is fuzzy, it may not always be the case that one correct division is obtained. In other words, it may not always be that $\Sigma Pi = 1$, and it may thus be regarded that the following describes the entropy H.

$$H = - \left( \sum_i Pi \log Pi \right) / \sum_1 Pi$$

In the present embodiment, the entropy H is calculated for a question which has not yet been generated, and selects a question which will make this entropy H a maximum.

In addition, the judgement to determine whether or not the final conclusion is reached is made by determining whether or not $P^*(\{a\})$ and $P_*(\{a\})$ with respect to a certain $a \in \theta$ have reached predetermined threshold values. When the predetermined threshold values are reached, it is judged that the final conclusion is reached, and the questioning is ended.

The third embodiment of the inference system comprises question generating means (12, 13, 14) for generating a question, input means (10) for entering an answer to the question generated by the question generating means, data storage means (12) for storing data showing a possibility of a conclusion depending on the answer, inference means (11) for making an inference by eliminating a degree of fuzziness of the conclusion by use of the data from the data storage means, question selection means (15) for selecting a question to be generated from the question generating means depending on the conclusion obtained from the inference means, and output means (17) for outputting the question generated from the question generating means and the conclusion obtained from the inference means, where the inference means converts the data obtained from the data storage means into Dempster-Shafer's basic probability assignment data in making the inference, and only the question selected by the question selection means is generated from the question generating means after the answer is entered from the input means.

Therefore, according to the present embodiment, the question selection part 15 selects the next question to be generated, and generates only the selected question.

For example, in the case where a question is given to the user and one animal in mind is to be selected from 100 kinds of Mammalia which are derived from the user's answer, the conventional inference system generates all of the prepared questions in a predetermined sequence even when the candidates of the conclusion is narrowed down to a Carnivora (whale, dolphin, orc, sea otter and the like) that live underwater. Hence, the conventional inference system may ask an irrelevant question such as "Does the animal have hoofs?", and the user must carry out a troublesome operation of entering a useless answer to the irrelevant question. It is possible even in such a conventional inference system not to answer a question the user cannot answer or elects not to answer, but in either case, the user must still read the question before he can disregard the question.

However, these problems of the conventional inference system are eliminated according to the present embodiment, because the valid questions are selected in the question selection part 15, and only the selected question is outputted from the question data storage part 16 to the display part 17. Thus, no unnecessary questions will be generated. Accordingly, the burden on the user to answer the questions is effectively reduced, and it is possible to shorten the time it takes to reach the conclusion by the fuzzy restriction.

Next, a description will be given on fourth and fifth embodiments of the inference system according to the present invention. According to the third embodiment described before, a which satisfies $P^*(\{a\}) > \epsilon$ is handled independently of $P_*(\{a\})$ and $P^*(\{a\})$, and it is impossible to discriminate the case where those having the high possibility are appropriately divided and the case where the division appears to be appropriate but most of those having the high possibility actually remain. The latter case applies to the question which will most likely lead to a specific answer when the possibility is taken into account, and applies to the question which has a high entropy when the possibility is not taken into account. Accordingly, a question which is of not much use may be selected as a result. In order to prevent the selection of the useless question, the fourth and fifth embodiments select the question by taking into account a distribution density function of the basic probability assignment, as will be described hereunder.

The following are obtained when the distribution density function of the basic probability assignment is denoted by m as a probability distribution on $2^\theta$.

$$P_*(A) = \sum_{B \subset A} m(B)$$

$$P^*(A) = \sum_{B \cap A \neq \phi} m(B)$$

When it is defined that $$\widetilde{P}(\{a\}) = \sum_{A \in B} m(B)/B \text{ and } \widetilde{P}(A) = \sum_{A \in B} P(\{a\})$$

the following can be obtained, where it is reasonable to assume $P(\cdot)$ as being the probability distribution on $\theta$.

$$P_*(A) \leq \widetilde{P}(A) \leq P^*(A)$$

$$\sum_{A \in \theta} \widetilde{P}(\{a\}) = 1$$

The probability Pi referred before may be described by the following by use of $\widetilde{P}$.

$$Pi = \left[ \sum_{A \in \theta_\epsilon} \widetilde{P}(\{a\}) \cdot \mu_{Fi}(a) \right] / \left[ \sum_{A \in \theta_\epsilon} \widetilde{P}(\{a\}) \right]$$

Therefore, by calculating the entropy H from the above formula, the possibility is reflected within $\theta_\epsilon$, and it is possible to obtain a more reasonable conclusion.

Figure 18A:
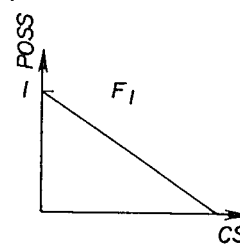
FIGS. 18A and 18B show a fuzzy division.
Figure 18B:
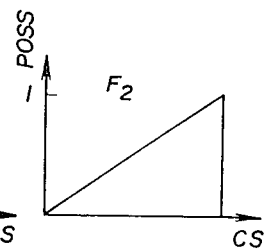
Figure 19A:
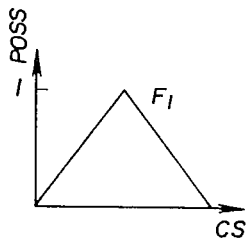
FIGS. 19A and 19B show another fuzzy division.
Figure 19B:
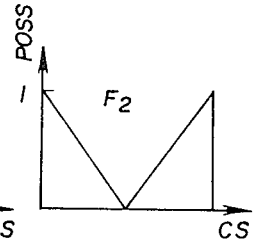
Figure 20:
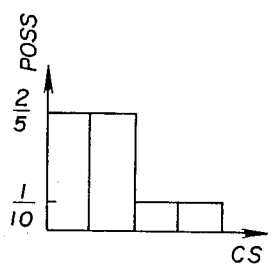
FIG. 20 shows a probability distribution.

For example, when the calculation is made under a uniform probability distribution, the entropies for a fuzzy division shown in FIGS. 18A and 18B and a fuzzy division shown in FIGS. 19A and 19B both become the same, that is, H=log 2. In FIGS. 18A, 18B, 19A and 19B and FIGS. 20, 21A and 21B which will be described later, the ordinate indicates the degree of possibility (value of the membership of the fuzzy set) POSS and the abscissa indicates the candidate set CS. Thus, the appropriateness of the next question seems to be the same regardless of which fuzzy division is used to select the next question. However, when the calculation is made under a probability distribution shown in FIG. 20, the entropy for the fuzzy division shown in FIGS. 18A and 18B becomes as follows while the entropy for the fuzzy division shown in FIGS. 19A and 19B becomes H=log 2.

$$H = \log 20/20 \sqrt{7^7 \times 13^{13}} \simeq \log 1.91$$

Accordingly, it may be seen that the fuzzy division shown in FIGS. 19A and 19B is better.

Figure 21A:
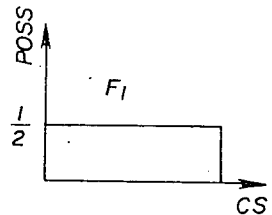
FIGS. 21A and 21B shows still another fuzzy division.
Figure 21B:
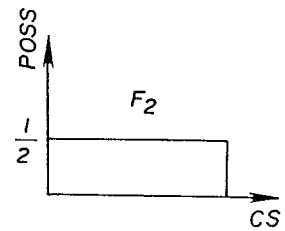

However, even when such a system is employed, the entropy H takes a maximum value of H=log 2 for a fuzzy division shown in FIGS. 21A and 21B.

Accordingly, in the fourth and fifth embodiments, a revision is carried out in addition to that carried out for Pi, so that a maximum value of $\mu_{Fi}(a)$ in $a \in \theta$ becomes 1. In other words, Qi obtained from the following formula is used, where Qi corresponds to Fi which is normalized in $\theta_\epsilon$.

$$Qi = \left[ \sum_{a \in \theta_\epsilon} \bar{P}(\{a\}) \cdot \mu_{Fi}(a) + \left( 1 - \max_{a \in \theta_\epsilon} \mu_{Fi}(a) \right) \cdot \sum_{\mu_{Fi}(a)>0} \bar{P}(\{a\}) \right] / \left[ \sum_{A \in \theta_\epsilon} \bar{P}(\{a\}) \right]$$

The fourth and fifth embodiments have the same block system as that shown in FIG. 1 described before.

When the entropy H is obtained from Pi and Qi, the following is obtained, wherein the fact that Qi is greater than Pi means a decrease in the information quantity.

$$H = \left[ - \sum_i Pi \log Qi \right] / \sum_i Pi$$

When this formula describing the entropy is used, the entropy of the fuzzy division shown in FIGS. 21A and 21B becomes H=0, and it is correctly indicated that this division is no information.

The judgement to determine whether or not the final conclusion is reached is made by determining whether or not $P_*(\{a\})$ and $P^*(\{a\})$ with respect to a certain $a \in \theta$ have reached predetermined threshold values. When the predetermined threshold values are reached, it is judged that the final conclusion is reached, and the questioning is ended.

The fourth embodiment of the inference system comprises question generating means (12, 13, 14) for generating a question, input means (10) for entering an answer to the question generated by the question generating means, data storage means (12) for storing data showing a possibility of a conclusion depending on the answer, inference means (11) for making an inference by eliminating a degree of fuzziness of the conclusion by use of the data from the data storage means, question selection means (15) for selecting a question to be generated from the question generating means depending on the conclusion obtained from the inference means, and output means (17) for outputting the question generated from the question generating means and the conclusion obtained from the inference means, where the inference means converts the data obtained from the data storage means into Dempster-Shafer's basic probability assignment data in making the inference, the question selection means calculates an entropy of a fuzzy division through normalization and selects only a question which makes this entropy a maximum, and only the question selected by the question selection means is generated from the question generating means after the answer is entered from the input means.

On the other hand, the fifth embodiment of the inference system comprises question generating means (12, 13, 14) for generating a question, input means (10) for entering an answer to the question generated by the question generating means, data storage means (12) for storing data showing a possibility of a conclusion depending on the answer, inference means (11) for making an inference by eliminating a degree of fuzziness of the conclusion by use of the data from the data storage means, question selection means (15) for selecting a question to be generated from the question generating means depending on the conclusion obtained from the inference means, and output means (17) for outputting the question generated from the question generating means and the conclusion obtained from the inference means, where the inference means converts the data obtained from the data storage means into Dempster-Shafer's basic probability assignment data in making the inference, the question selection means selects only a question which makes an entropy of a fuzzy division a maximum, and only the question selected by the question selection means is generated from the question generating means after the answer is entered from the input means.

According to the fourth and fifth embodiments, the entropy of the fuzzy division is obtained by normalization and the selection of the question is made by selecting the question which makes the entropy a maximum. For this reason, the question may be selected appropriately for various fuzzy divisions. In other words, the valid question is selected and only the selected question is outputted so as not to generate an unnecessary question. Therefore, the burden on the user is effectively reduced.

Figure 22:
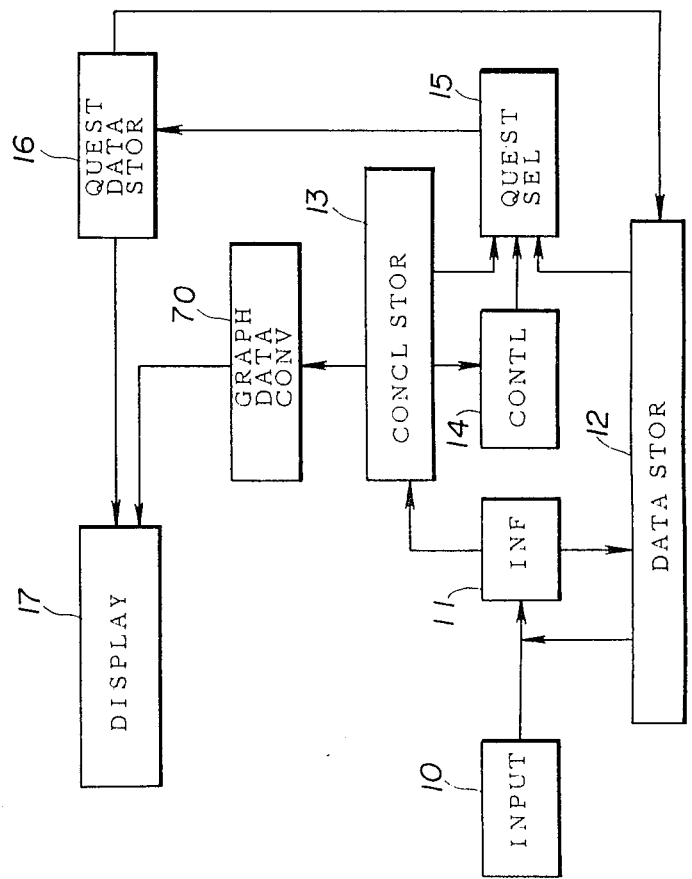
FIG. 22 is a system block diagram showing a sixth embodiment of the inference system according to the present invention.

Next, a description will be given on a sixth embodiment of the inference system according to the present invention, by referring to FIG. 22. In FIG. 22, those parts which are the same as those corresponding parts in FIG. 1 are designated by the same reference numerals, and a description thereof will be omitted.

In the present embodiment, a graph data converting part 70 is provided between the output of the conclusion storage part 13 and the input of the display part 17. The graph data converting part 70 converts the conclusion stored in the conclusion storage part 13 into a data for making a graphic display on the display part 17, and supplies the converted data to the display part 17. The graph data converting part 70 may be constituted by a microprocessor or a program.

In the present embodiment, the candidates of the conclusion are also finite. The restriction of the fuzzy conclusion made in the inference part 11 based on the user's answer to the generated question is carried out by use of the Dempster-Shafer's basic probability assignment data. This Dempster-Shafer's basic probability assignment data is obtained based on the possibility distribution shown in FIG. 17 described before.

The corresponding data of the user's answer (input information) and the fuzzy restriction of the conclusion constitute a table of the possibility distribution shown in FIG. 17. The possibility distribution data obtained from this table is converted into the basic probability assignment data according to the Dempster's rule of combination.

The following data exist as the conclusion of the inference made in the inference part 11.

When a set of the candidates of the conclusion is denoted by $\theta$ and the family of sets of the entire subsets of the set $\theta$ is denoted by $2^\theta$, the basic probability assignment on $\theta$ is a probability distribution on $2^\theta - \{\phi\}$. With respect to $\phi$, the probability distribution may be on $2^\theta$ which gives 0.

With respect to $A \in 2^\theta$, a lower probability $P_*(A)$ of the set A and an upper probability $P^*(A)$ of the set A can be given by the following, as described before.

$$P_*(A) = P(\{S \in 2^\theta | S \subset A\})$$

$$P^*(A) = P(\{S \in 2^\theta | S \cap A \neq \phi\})$$

The lower probability $P_*(A)$ describes the degree of belief that the conclusion belongs to the set A, while the upper probability $P^*(A)$ describes the degree of plausibility that the conclusion belongs to the set A.

The degree of doubt $D(A)$ and the degree of negligence (or unknown) $U(A)$ may be given by the following.

$$D(A) = 1 - P^*(A)$$

$$U(A) = P^*(A) - P_*(A)$$

The degree of doubt $D(A)$ describes the degree of belief that the conclusion does not belong to the set A. On the other hand, the degree of ignorance $U(A)$ describes the degree of ignorance to whether or not the conclusion belongs to the set A.

For example, it will be assumed once again for convenience' sake that the user thinks of an animal and the inference system guesses the animal in mind. Suppose that the lower probability $P_*(seal) = 0.20$, the upper probability $P^*(seal) = 0.95$, the degree of ignorance $U(seal) = 0.75$ and the degree of doubt $D(seal) = 0.05$ for a conclusion that the animal in mind is a "seal". These data on this conclusion are stored in the conclusion storage part 13 and are supplies to the graph data converting part 70. In the graph data converting part 70, these data are converted into data for graphic display on the display part 17 and are then supplied to the display part 17. The data supplied to the display part 17 from the graph data converting part 70 are displayed as shown in FIG. 23 or 24, for example.

Figure 23:
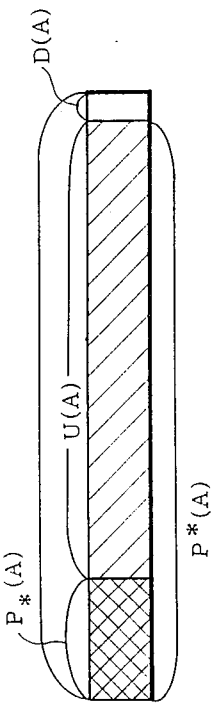
FIGS. 23 and 24 respectively show a graphic display which is made by the block system shown in FIG. 22.
Figure 24:
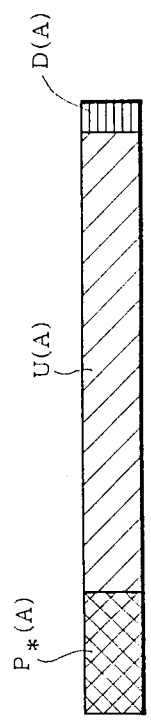

In FIG. 23, the upper probability $P^*(A)$ and the lower probability $P_*(A)$ are indicated by a rightwardly inclined hatching and a leftwardly inclined hatching, respectively. On the other hand, in FIG. 24, the degree of belief $P_*(A)$ is indicated by a cross-hatching, the degree of doubt $D(A)$ is indicated by parallel horizontal lines, and the degree of ignorance $U(A)$ is unmarked.

By making a graphic display of the conclusion on the display part 17, the user can easily understand the conclusion of the inference. For example, in the case of the graphic display shown in FIG. 23, it can be seen at a glance the percentage the upper and lower probabilities $P^*(A)$ and $P_*(A)$ respectively occupy out of the whole. In the case of the graphic display shown in FIG. 24, it is easy to understand the respective percentages the degree of belief $P_*(A)$, the degree of ignorance $U(A)$ and the degree of doubt $D(A)$ occupy out of the whole.

The question selection part 15 reads out from the conclusion storage part 13 the intermediate conclusion obtained by making an inference on a user's answer to a question, and selects the next question based on this intermediate conclusion. The operation of the remaining parts of the block system shown in FIG. 22 is identical to that of the embodiments described heretofore.

The sixth embodiment of the inference system comprises question generating means (12, 13, 14) for generating a question, input means (10) for entering an answer to the question generated by the question generating means, data storage means (12) for storing data showing a possibility of a conclusion depending on the answer, inference means (11) for making an inference by eliminating a degree of fuzziness of the conclusion by use of the data from the data storage means, output means (17) for outputting the conclusion obtained from the inference means, and data converting means (70) for converting the conclusion obtained from the inference means into a data having a predetermined form for being outputted by the output means, where the inference means converts the data obtained from the data storage means into Dempster-Shafer's basic probability assignment data in making the inference, and the output means makes a graphic display of the conclusion obtained from the inference means.

Therefore, according to the present embodiment, it is possible to comprehensively display the conclusion of the inference in a form the user can easily understand.

Figure 25:
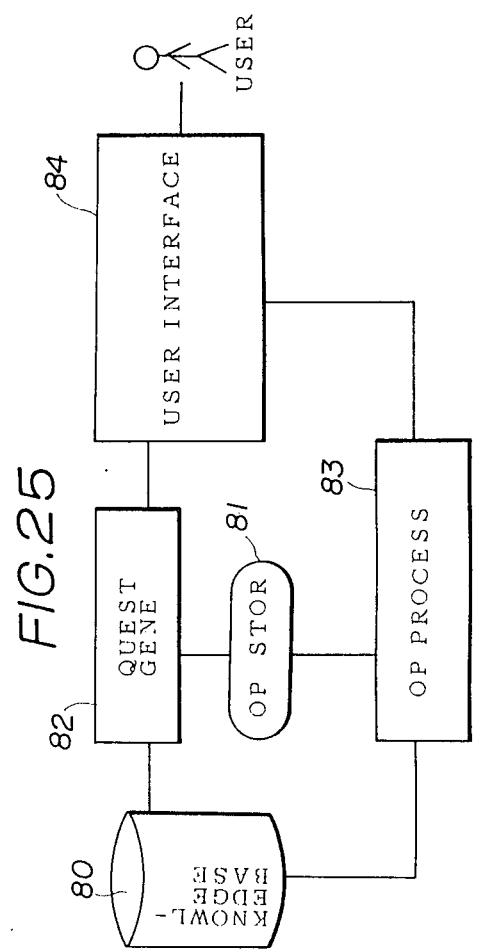
FIG. 25 shows an embodiment of a knowledge based system applied with the inference system according to the present invention.

FIG. 25 shows an embodiment of the knowledge based system applied with the inference system according to the present invention. The knowledge based system comprises a knowledge base 80 which is a semi-permanent storage part for storing knowledge data, an operation storage part 81 for temporarily storing the input information entered by the user and intermediate conclusions, a question generating part 82 for generating questions, an operation processing part 83 and a user interface 84. The question generating part 82 and the operation processing part 83 constitute an inference engine for making an inference by referring to the knowledge base 80 and the operation storage part 81 and for rewriting the contents of the stored operation. Hence, the knowledge based system is basically made up of four elements. The question generating part 82 selects the information item which will be required next in order to effectively progress the inference with reference to the operation storage part 81 and the knowledge base 80, and asks a question to the user through the user interface 84 on the selected information item. An answer from the user is obtained through the user interface 84. The operation processing part 83 progresses the inference by adding the information obtained from the user's answer to the existing available information.

The knowledge based system obtains the information in the form of the user's answers by selecting the information item and asking the user questions on the selected information item, and determines the value of the subject of the inference from among a candidate set. For example, in the case where the subject of the inference is "Mammalia" and the candidate set is {platypus, koala, kangaroo, . . . , rabbit, elephant shrew}, the candidates are narrowed down by successively selecting the information items such as the size and diet of the animal, and the name of the Mammalia in mind is determined.

In the knowledge processing apparatus described before in conjunction with FIG. 2, the inference system shown in FIG. 1, that is, the first embodiment, is employed to generate the questions. But according to such a method of generating the questions, no consideration is made as to which answer the user is likely to select when he is puzzled. In other words, no weight is given on the answers. In addition, there is a tendency to overevaluate the probability that an answer leads to a selection branch when puzzled. For example, suppose that a certain question is given to determine a value from a candidate set {a, b, c, d} and there are three possible answers which are {yes, no, either}, and further, that the certain question may be a question Q1 having a possibility distribution shown in FIGS. 26A through 26C for each of the three possible questions or a question Q2 having a possibility distribution shown in FIGS. 27A through 27C for each of the three possible questions. FIGS. 26A and 27A show the possibility distribution for the answer "yes", FIGS. 26B and 27B show the possibility distribution for the answer "no", and FIGS. 26C and 27C show the possibility distribution for the answer "either".

It will be assumed that there is no difference among the values of the candidates a, b, c and d, and the possibility distribution is uniform for the four candidates. In the case where the question Q1 is designed to group the four candidates into two groups of two and two and the question Q2 is designed to group the four candidates into two groups of one and three, it may be regarded that the question Q1 is superior compared to the question Q2 when the average efficiency of the former is considered. Of course, no information can be obtained if the answer to the question Q1 is "either", but there is little chance that such a case would occur.

However, when the questions Q1 and Q2 are evaluated according to the evaluation method described before in conjunction with the first embodiment, the following results are obtained.

$$H(Q1) = -(2/4.4)x\log(2/4) - (2/4.4)x\log(2/4)$$
$$\phantom{H(Q1)} -(0.4/4.4)x\log(4/4)$$
$$\phantom{H(Q1)} = 0.630$$
$$H(Q2) = -(1/5.4)x\log(1/4) - (3.1/5.4)x\log(3.1/4)$$
$$\phantom{H(Q2)} -(1.3/5.4)x\log(1.3/4)$$
$$\phantom{H(Q2)} = 0.674$$

Therefore, although unnatural, the evaluation of the question Q2 is higher than that of the question Q1.

The reason for this evaluation is that P1(·;·) such as 2/4.4, 0.4/4.4 and 1/5.4 in example above are given by the following formula which is unequal with respect to the candidate set, where x denotes the candidate, q denotes the question, a denotes the answer, p(·) denotes the probability distribution and $\pi(\cdot;q,a)$ denotes the possibility distribution.

$$P1(a;q) = \left[ \sum_x p(x)\pi(x;q,a) \right] / \left[ \sum_a \sum_x p(x)\pi(x;q,a) \right]$$

Accordingly, in a seventh embodiment of the inference system according to the present invention, the following formula which is equal to the candidate group is used to calculate P1. The block system of the seventh embodiment may have any of the constructions shown in FIGS. 1, 15 and 22.

$$P1(a;q) = \sum_x p(x) \cdot \pi(x;q,a) / \left[ \sum_a \pi(x;q,a) \right]$$

The above formula used in the seventh embodiment for generating the question is an improvement over that used in the first embodiment. When this formula is applied to the question selection part 15 and the questions Q1 and Q2 are evaluated, the following results are obtained which clearly shows that the evaluation of the question Q1 is higher than that of the question Q2.

$$H(Q1) = 0.630$$
$$H(Q2) = -[(1/2.1)/4]x\log(1/4)$$
$$\phantom{H(Q2)} -[(0.1/2.1 + 3/1.1)/4]x\log(3.1/4)$$
$$\phantom{H(Q2)} -[(1/2.1 + 0.3/1.1)/4]x\log(1.3/4)$$
$$\phantom{H(Q2)} = 0.552$$

Instead of using the possibility distribution $\pi$, it is possible to multiply to the possibility distribution $\pi$ a weight w(a;q) of the answer and use it as follows, making it possible to put a weight on the answer.

$$P1(a;q) = \sum_X p(x) \cdot [w(a;q)\pi(x;q,a)] / \left[ \sum_a w(a;q)\pi(x;q,a) \right]$$

Therefore, according to the present embodiment, it is possible to generate more appropriate questions by improving the method of generating the questions, and furthermore, it is possible to put weight on the answers. Hence, this seventh embodiment is especially suited for use in a trouble diagnosis support system or the like.

Figure 28:
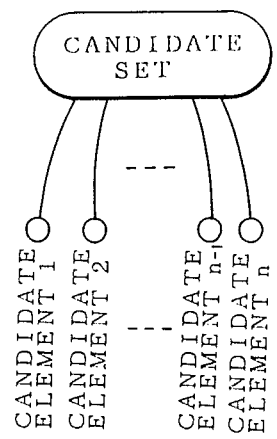
FIG. 28 shows the structure of a candidate set.

In the knowledge processing apparatus described in conjunction with FIG. 2, the knowledge is written in the form of a table of the candidate set and the information item as shown in FIG. 3 making it convenient for the user who writes the knowledge. However, the set is treated as a flat structure having no subset level as shown in FIG. 28. As a result, when the candidate set is large, the table such as that shown in FIG. 3 becomes extremely large and it is sometimes difficult for the user to grasp the knowledge as a whole.

Figure 29:
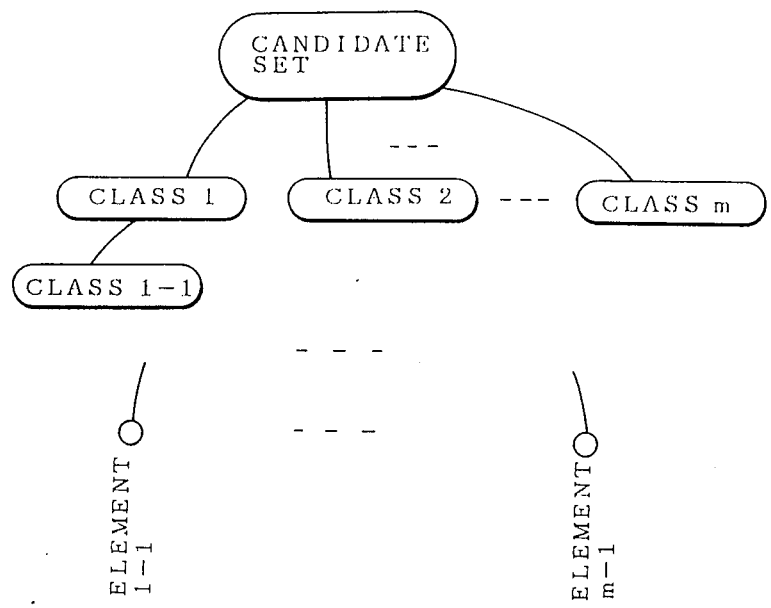
FIG. 29 shows the level structure of the candidate set.

Accordingly, the candidate set may be written as a pair made up of a list of classes or a list of elements and a discriminator indicating whether the list lists the classes or the elements. In this case, the candidate set has multiple levels as shown in FIG. 29. In FIG. 29, each class has the same structure as the candidate set. When the candidate set is classified without direct connection to the elements, the class is first determined by the inference and the inference is continued thereafter by considering the class as a new candidate set.

Figure 30:
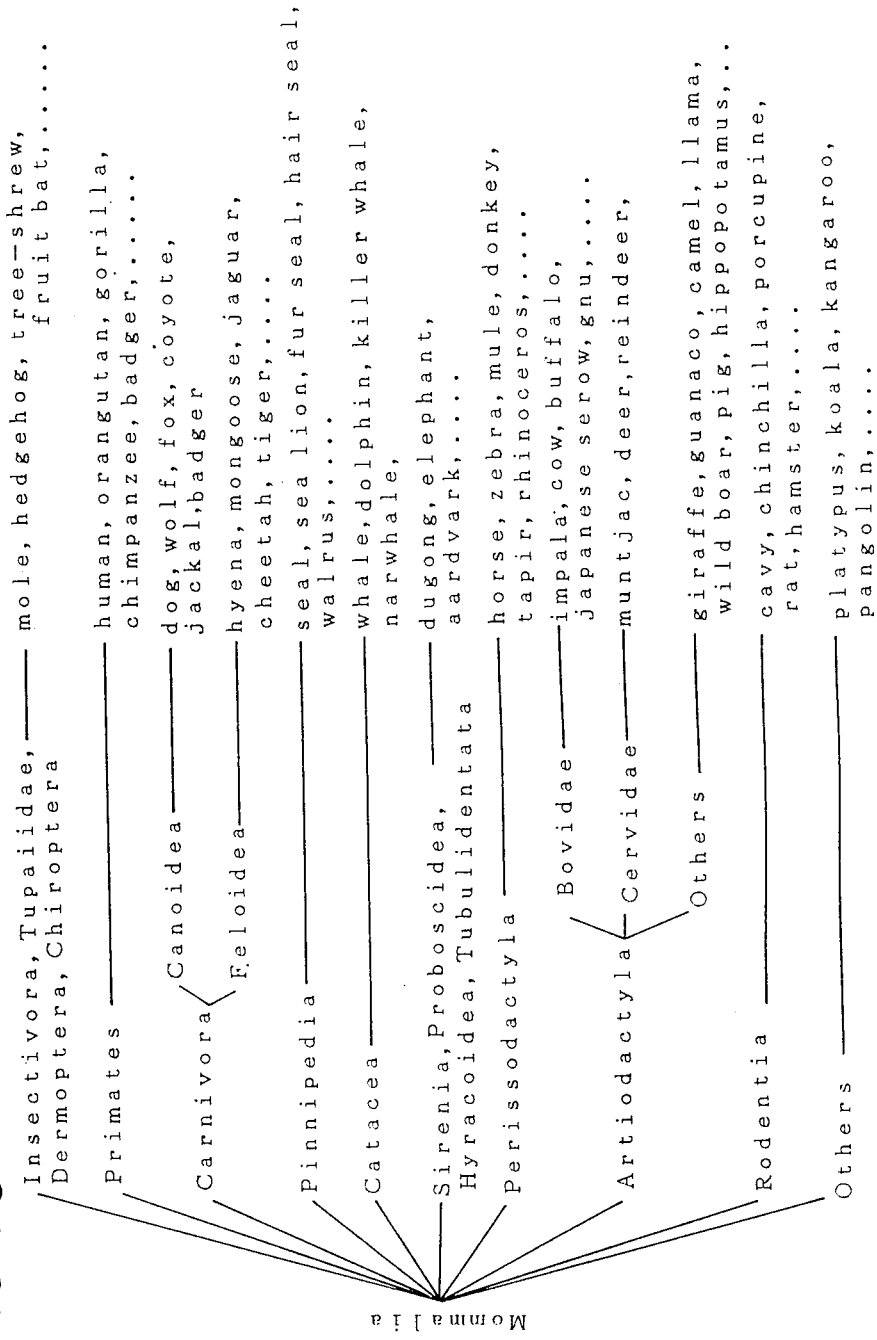
FIG. 30 shows classification of Mammalia into multiple levels.

Therefore, by taking these measures in an eighth embodiment of the inference system according to the present invention, it becomes possible to distinguish even an extremely large candidate set into a relatively small number of classes. The block system of the eighth embodiment may have any of the constructions shown in FIGS. 1, 15 and 22. For this reason, the writing of the knowledge is facilitated and the ability to read the knowledge is improved In addition, when making a selection, the candidates in most cases have a class level such as phyletic classification of animals and decimal classification of books. Hence, permitting the classification of the candidate set also has the effect of facilitating the user to obtain knowledge from experts. Taking the Mammalia as an example, the Mammalia may be classified into levels shown in FIG. 30.

Furthermore, the writing of the knowledge for use in the Dempster-Shafer's inference and the obtaining of the knowledge on a man-to-man basis are facilitated. In addition, the entry and revision of the knowledge are facilitated and the knowledge as a whole can be grasped with ease in the knowledge based shell because the ability to read the knowledge is improved. Conventionally, systems which employ the Dempster-Shafer's inference do not take into account the method of facilitating the entry of the knowledge. But the present embodiment provides an improved method of entering the knowledge, and the present embodiment is not only applicable to the knowledge based shell but is also especially suited for application to a trouble diagnosis support system, intention determination support system, medical diagnosis support system and the like.

On the other hand, suppose that the candidate set is described by the classified levels, and the class to which the value of the subject of inference belongs or the element which is the value itself is determined in each level according to the Dempster-Shafer's inference, or when the value is not yet determined, the inference is continued by assuming the class as a new candidate set. In such cases, the information item required for the selection in each level may not necessarily differ from the information item used for the selection in a higher level. This is because the knowledge often includes an exception. For example, when guessing the Mammalia in mind, when the class "Carnivora" is selected from the information "lives on meat", "lives on land" and "has sharp fang", it should be able to exclude "giant panda" without any additional information because "giant panda" is a Carnivora but does not live on meat.

Figure 31:
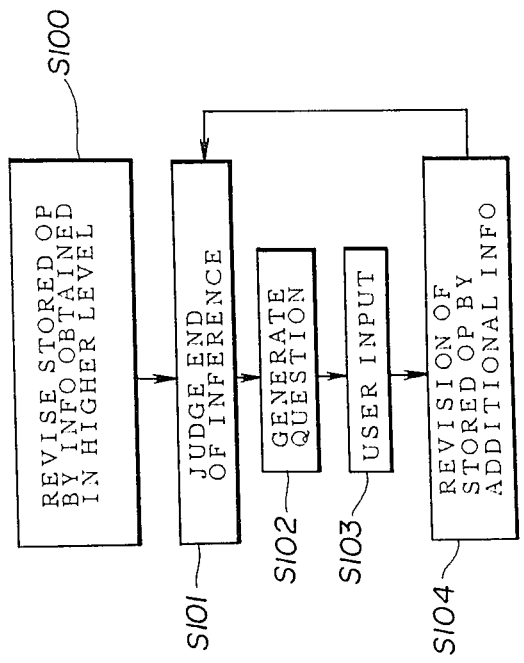
FIG. 31 is a flow chart for explaining the operation of a ninth embodiment of the inference system according to the present invention.

By considering the above, a ninth embodiment of the inference system according to the present invention carries out a process shown in FIG. 31. The block system of the ninth embodiment may have any of the constructions shown in FIGS. 1, 15 and 22.

In FIG. 31, a step S100 permits the information item to share information between classes or levels, and when an information used for the selection of the class in a higher level is usable for the selection in a lower level, the information is used to revise the content of the stored operation. Then, a step S101 judges the end of the inference and a step S102 generates a question. A step S103 enters the answer from the user, and a step S104 revises the stored operation by use of the additionally obtained information. As a result, the input information from the user can be used more effectively in the knowledge based system.

In the ninth embodiment, the candidate set has a multiple level structure as shown in FIG. 29, and after making the selection of a class to which the value of the subject of inference belongs, the inference is continued by considering the class as a new candidate set, and the input information from the user is used effectively at that time. This means that the process cannot advance until the class in the intermediate level is determined. Consequently, it is essential that the knowledge makes it possible to always determine the class, and this may reduce the practicality of the knowledge based system.

For example, when making a trouble diagnosis of a device, the diagnosis may be made by carrying out the steps of determining a faulty block from an abnormal phenomenon and then determining a faulty location within the faulty block. But instead, it more closely resembles the method used by human experts if the diagnosis were made by carrying out the steps of first checking for blocks having a high probability if being faulty and then checking another block when those blocks are not faulty. In other words, it is easier to make a knowledge according to the latter procedure.

According to a tenth embodiment of the inference system according to the present invention, it is possible to effectively cope with the case where there is difficulty in progressing the inference after the class is determined in an intermediate level. The block system of the tenth embodiment may have any of the constructions shown in FIGS. 1, 15 and 22.

In the present embodiment, the inference progresses on the assumption that the class is determined to a most prominent one when the class cannot be determined. When the degree of contradiction, that is, the degree of contention, exceeds a predetermined threshold value during the Dempster's rule of combination, a backtracking is made on the assumption that the selection of the class is in error and the inference progresses on the assumption that the class is determined to a next most prominent one. Similarly thereafter, such processes are repeated until the value of the subject of inference is determined or until it becomes no longer possible to continue the inference. Hence, the ability of writing the knowledge of the Dempster-Shafer's inference system is expanded. In other words, the making of the knowledge is facilitated, and the practicability of the knowledge based system is improved.

When the change in the validity of the information obtained afterwards is considered, the inference system of the present embodiment is improved when the backtracking described above is made. Hence, according to this improved inference system, the inference is first continued on the assumption that the class is determined to the most prominent one when it is impossible to determine the class to which the value of the subject of inference belongs. In addition, when the degree of contradiction or contention exceeds a predetermined threshold value during the Dempster's rule of combination, a backtracking is made to a higher level and the validity is re-calculated by adding the information obtained in the lower level. Thereafter, the inference is continued on the assumption that the class is first determined to the most prominent one. Such a process is repeated until the value of the subject of inference is determined or until it becomes no longer possible to continue the inference, as described before. Hence, the making of the knowledge of the Dempster-Shafer's inference system is facilitated, and the practicability of the knowledge based system is improved since the sequence of the inference is natural.

Further, the present invention is not limited to these embodiments, but various variations and modifications may be made without departing from the scope of the present invention.

What is claimed is:
1. An inference system comprising:
   input means for entering data to be used for making an inference;
   data storage means for storing possibility distribution data showing a possibility of a conclusion depending on the data entered from said input means;
   inference means for making an inference by eliminating a degree of fuzziness of said conclusion by use of the data entered from said input means; and
   output means for outputting said conclusion obtained from said inference means, said inference means comprising means for normalizing the possibility distribution data obtained from said data storage means as a fuzzy set so as to convert the possibility distribution data into Dempster-Shafer's basic probability assignment data in making the inference.

2. An inference system as claimed in claim 1 in which said inference means converts fuzzy set data obtained from said data storage means into the Dempster- Shafer's basic probability assignment data and makes the inference based on the Dempster-Shafer's basic probability assignment data according to Dempster-Shafer theory.

3. An inference system comprising:
input means for entering data to be used for making an inference;
data storage means for storing data showing a possibility of a conclusion depending on the data entered from said input means;
inference means for making an inference by eliminating a degree of fuzziness of said conclusion by use of the data entered from said input means, said inference means comprising means for converting the data obtained from said data storage means into Dempster-Shafer's basic probability assignment data in making the inference;
output means for outputting said conclusion obtained from said inference means;
question generating means for generating a question; and
questions selection means for selecting a question to be generated from said question generating means, said input means entering an answer to the question generated by said question generating means, said data storage means storing data showing a possibility of a conclusion depending on the answer entered from said input means, said question selection means selecting the question to be generated from the question generating means depending on the conclusion obtained from said inference means, said output means outputting at least the conclusion obtained from said inference means, said question generating means generating only the question selected by said question selection means after the answer is entered from said input means.

4. An inference system as claimed in claim 3 in which said output means also outputs the question generated from said question generating means.

5. An inference system as claimed in claim 4 in which said output means also outputs the answer entered from said input means.

6. An inference system as claimed in claim 3 in which said output means comprises display means for displaying at least the conclusion obtained from said inference means.

7. An inference system as claimed in claim 3 in which said question selection means calculates an entropy of a fuzzy division through normalization and selects only a question which makes the entropy a maximum, where the question is the fuzzy division of a candidate set by the answer, said candidate set being a set of candidates of the conclusion.

8. An inference system as claimed in claim 3 in which said question selection means selects only a question which makes an entropy of a fuzzy division a maximum, where the question is the fuzzy division of a candidate set by the answer, said candidate set being a set of candidates of the conclusion.

9. An inference system as claimed in claim 8 in which said question selection means makes an evaluation based on a following formula in selecting the question, $$Pl(a;q) = \sum_{x} p(x) \cdot \pi(x;q,a) / \left[ \sum_{a} \pi(x;q,a) \right]$$

where x denotes a candidate of the conclusion, q denotes the question, a denotes the answer, p(·) denotes a probability distribution and $\pi(\cdot;q,a)$ denotes a possibility distribution.

10. An inference system as claimed in claim 8 in which said question selection means makes an evaluation based on a following formula in selecting the question, $$Pl(a;q) = \sum_{x} p(x) \cdot [w(a;q)\pi(x;q,a)] / \left[ \sum_{a} w(a;q)\pi(x;q,a) \right]$$

where x denotes a candidate of the conclusion, q denotes the question, a denotes the answer, p(·) denotes a probability distribution, $\rho(\cdot;q,a)$ denotes a possibility distribution and w(a;q) denotes a weight of the answer.

11. An inference system comprising:
input means for entering data to be used for making an inference;
data storage means for storing data showing a possibility of a conclusion depending on the data entered from said input means;
inference means for making an inference by eliminating a degree of fuzziness of said conclusion by use of the data entered from said input means, said inference means comprising means for converting the data obtained from said data storage means into Dempster-Shafer's basic probability assignment data in making the inference;
output means for outputting said conclusion obtained from said inference means; and
said inference means determining a valve of a subject of inference according to Dempster-Shafer theory and describing a set of candidates of the valve in levels by classifying the set.

12. An inference system as claimed in claim 11 in which said inference means continues the inference by temporarily selecting a most prominent class when the class to which said value belongs cannot be determined and backtracks to a next prominent class when a degree of contradiction exceeds a predetermined value during Dempster's rule of combination.

13. An inference system as claimed in claim 11 in which said inference means continues the inference by temporarily selecting a most prominent class when the class to which said value belongs cannot be determined and backtracks to re-select the most prominent class by use of an information obtained after the selection of the class to continue the inference when a degree of contradiction exceeds a predetermined value during Dempster's rule of combination.

14. An inference system comprising:
input means for entering data to be used for making an inference;
data storage means for storing data showing a possibility of a conclusion depending on the data entered from said input means;
inference means for making an inference by eliminating a degree of fuzziness of said conclusion by use of the data entered from said input means, said inference means comprising means for converting the data obtained from said data storage means into Dempster-Shafer's basic probability assignment data in making the inference;
output means for outputting said conclusion obtained from said inference means; and said inference means determining a value of a subject of inference according to Dempster-Shafer theory from a set of candidates of the value having a classified level structure and using a predetermined information in making an inference in a certain level, said predetermined information being used in selecting a class in a lever which is higher than said certain level.

15. An inference system as claimed in claim 14 in which said inference means continues the inference by temporarily selecting a most prominent class when the class to which said value belongs cannot be determined and backtracks to a next prominent class when a degree of contradiction exceeds a predetermined value during Dempster's rule of combination.

16. An inference system as claimed in claim 14 in which said inference means continues the inference by temporarily selecting a most prominent class when the class to which said value belongs cannot be determined and backtracks to re-select the most prominent class by use of an information obtained after the selection of the class to continue the inference when a degree of contradiction exceeds a predetermined value during Dempster's rule of combination.

17. An inference system comprising:
input means for entering data to be used for making an inference;
data storage means for storing data showing a possibility of a conclusion depending on the data entered from said input means;
inference means for making an inference by eliminating a degree of fuzziness of said conclusion by use of the data entered from said input means, said inference means comprising means for converting the data obtained from said data storage means into Dempster-Shafer's basic probability assignment data in making the inference;
output means for outputting said conclusion obtained from said inference means; and
data converting means for converting the conclusion obtained from said inference means into data having a predetermined form for being outputted by said output means, said output means comprising display means for making a graphic display of the conclusion which is obtained from said inference means through said data converting means.

18. An inference system as claimed in claim 17 in which said display means displays at least a lower probability and an upper probability.

19. An inference system as claimed in claim 17 in which said display means displays at least a degree of belief, a degree of ignorance and a degree of doubt.

20. An inference system comprising:
input means for entering data to be used for making an inference;
data storage means for storing possibility distribution data showing a possibility of a conclusion depending on the data entered from said input means;
inference means for making an inference by eliminating a degree of fuzziness of said conclusion by use of the data entered from said input means;
output means for outputting said conclusion obtained from said inference means; and
said inference means comprising means for converting the possibility distribution data obtained from said data storage means into Dempster-Shafer's basic probability assignment data in making the inference and means for revising the basic probability assignment data so that a portion indicating an assignment to the whole event increases by multiplying a coefficient to each value in the basic probability assignment data and adding a coefficient to the assignment to the whole event.

* * * * *